United States Patent
Kolych et al.

(10) Patent No.: US 12,382,248 B2
(45) Date of Patent: Aug. 5, 2025

(54) DETERMINATION AND TRACKING OF TRAJECTORIES OF MOVING OBJECTS IN WIRELESS APPLICATIONS

(71) Applicant: Cypress Semiconductor Corporation, San Jose, CA (US)

(72) Inventors: Igor Kolych, Lviv (UA); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 557 days.

(21) Appl. No.: 17/733,919

(22) Filed: Apr. 29, 2022

(65) Prior Publication Data

US 2023/0353980 A1    Nov. 2, 2023

(51) Int. Cl.
  *H04W 4/02* (2018.01)
  *G01S 5/02* (2010.01)
  *H04W 4/029* (2018.01)

(52) U.S. Cl.
  CPC ......... *H04W 4/027* (2013.01); *G01S 5/0294* (2013.01); *H04W 4/023* (2013.01); *H04W 4/029* (2018.02)

(58) Field of Classification Search
  None
  See application file for complete search history.

(56) References Cited

U.S. PATENT DOCUMENTS

| | | | |
|---|---|---|---|
| 2009/0087023 A1* | 4/2009 | Porikli | G06T 7/277 382/103 |
| 2012/0148102 A1* | 6/2012 | Moriguchi | G06T 7/277 382/103 |
| 2021/0136515 A1* | 5/2021 | Zhang | H04W 4/023 |
| 2021/0312811 A1* | 10/2021 | Ohlarik | G08G 1/20 |

OTHER PUBLICATIONS

E. Lee, "High Accuracy Distance Measurement for Bluetooth Based on Phase Ranging", Session : De-facto Standard Development Organization #3, 24 pgs. (May 24, 2019).

* cited by examiner

*Primary Examiner* — Adolf Dsouza

(57) ABSTRACT

Implementations disclosed describe techniques and systems for efficient determination and tracking of trajectories of objects in an environment of a wireless device. The disclosed techniques include, among other things, determining multiple sets of sensing values that characterize one or more radio signals received, during a respective sensing event, from an object in an environment of the wireless device. Multiple likelihood vectors may be obtained using the sensing values and characterizing a likelihood that the object is at a certain distance from the wireless device. A likelihood tensor may be generated, based on the likelihood vectors, that characterizes a likelihood that the object is moving along one of a set of trajectories. The likelihood tensor may be used to determine an estimate of the trajectory of the object.

21 Claims, 12 Drawing Sheets

DETERMINATION AND TRACKING OF TRAJECTORIES OF MOVING OBJECTS IN WIRELESS APPLICATIONS

TECHNICAL FIELD

The present disclosure pertains to wireless networks. More specifically, the present disclosure pertains to measuring location and velocity of wireless devices by detecting sensing signals that carry information about distances to such devices. The present disclosure further pertains to fast and efficient determination and tracking of trajectories of devices using the distance information.

BACKGROUND

Personal area networks (PAN), such as Bluetooth (BT), Bluetooth Low Energy (BLE), and wireless local area networks (WLAN), such as Wi-Fi networks and other networks operating under the IEEE 802.11 or other wireless standards, provide wireless connection for various personal industrial, scientific, and medical applications. Many BT, BLE, and IEEE 802.11 applications use identification and secure communications that are predicated on correct localization of various objects that carry a wireless device. For example, automotive applications deploy passive keyless entry systems that localizes a key fob and locks/unlocks/starts the car based on the proximity of the key fob to the car. Similarly, a tire pressure monitoring system identifies a specific tire whose pressure falls below a certain reading. BLE specification defines a variety of techniques for performing object localization, such as by estimating signal strength of received wireless signals (e.g., received signal strength indication, RSSI), angle (direction) of arrival (AoA) of wireless signals, high-accuracy distance measurements (HADM) using time-of-flight (ToF) channel sensing, phase-based ranging (PBR), and other techniques. AoA uses multiple sensors (antennas) that exploit differences in phases of one or more unmodulated tones arriving at the sensors (positioned at different points in space) to estimate the directions of the wave propagation. Similarly, channel sensing (e.g., HADM) estimates a distance to an object (e.g., another BLE device) by measuring phase delays accumulated by a plurality of signals of different frequencies along a path from an initiator wireless device to return wireless device and back.

BRIEF DESCRIPTION OF THE DRAWINGS

FIG. 3A depicts a grid in the location-velocity space, each element (square) of the grid being associated with a corresponding value of the likelihood tensor obtained for a first sensing event; FIG. 3B illustrates processing of additional data obtained for a second sensing event.

DETAILED DESCRIPTION

Figure 1:
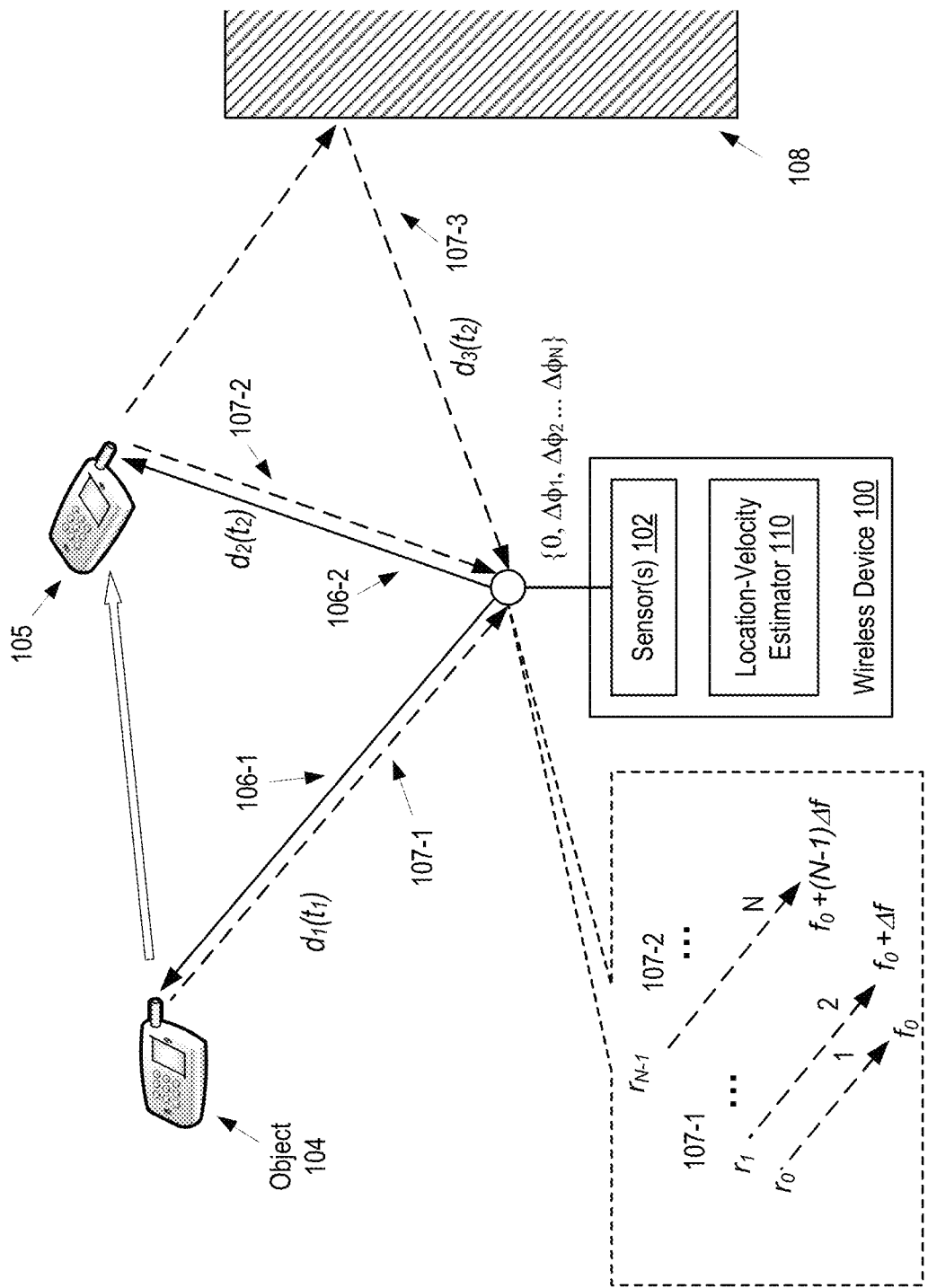
FIG. 1 illustrates one example setup for trajectory determination and tracking by a wireless device, in accordance with some implementations.

In various applications, wireless devices and various moving (or movable) objects that carry wireless devices, e.g., people, vehicles, cell phones, key fobs, items stored in a warehouse, etc., may be tracked using wireless (e.g., radio) signals. A distance to an object may be measured (e.g., using PBR techniques) for a series of times $t_i$ and the object's trajectory may be determined based on the measured distances $d_i(t_i)$. The trajectory of the object can then be estimated using a variety of techniques, such as deploying a Kalman filter to estimate the actual distance $d(t)$, its first time derivative $\dot{d}(t)$, second time derivative $\ddot{d}(t)$, and so on. In some applications, trajectory estimation is performed using neural networks to process measurement data, and/or other techniques. All such approaches typically involve a significant post-processing of measured data that can exceed computational resources of low-power microprocessor devices used in automotive applications, Internet-of-Things applications, sensing and monitoring applications, and the like.

Aspects and implementations of the present disclosure address these and other limitations of the existing technology by enabling systems and methods of trajectory determination and tracking using sensing signals whose phase changes in the course of propagation to and from an object may be detected and analyzed. More specifically, a variety of signal-processing techniques may be used to estimate a distribution $P(d)$, also referred to as a likelihood vector throughout this disclosure, that the distance to an object has a particular value d at the time of sensing. Due to the inherently noisy radio environment, the distribution (likelihood vector) may have a maximum at some value of distance, but may possess some uncertainty (width). Unlike conventional techniques, that identify the most likely distance d for each sensing event and then track this most likely distance with additional sensing events to determine the object's trajectory, the techniques disclosed herein first convert the likelihood vector (or a set of likelihood vectors obtained for different sensing events $P_i(d)$) into a likelihood tensor, e.g., $P(d_0, v)$. In one non-limiting example, the likelihood tensor $P(d_0, v)$ may be a tensor in location-distance space $d_0$-$v$ whose values (elements) characterize the likelihood that the trajectory of the object, e.g., $d(t)=d_0+vt$, is described by a particular reference distance $d_0$ (distance to the object at some reference time, e.g., $t=0$) and velocity $v$. The estimation of the trajectory may then be performed by identifying maxima of the likelihood tensor $P(d_0, v)$, which may be updated with each additional set of sensing data, so that the changes in the trajectory of the object (e.g., due to acceleration or deceleration) may be tracked in real time. The described techniques allow disambiguation of multiple paths of the returned signals, which appear as multiple maxima of the likelihood tensor. Numerous additional implementations are disclosed herein. For example, a reduced number of elements of the likelihood vector $P(d_s)$ for a limited set of distances $d_s$ may be computed and then expanded (e.g., using interpolation techniques) to a larger array of values of the likelihood vector. Similar techniques may be used for computation of the elements of the likelihood tensor $P(d_0, v)$.

In one example of BLE systems, during a sensing event, N waves of different frequencies (tones) $f_j(j \in [1, N])$, from BT bandwidth (i.e., from 2.402 GHz to 2.480 GHz) spaced within the 1-80 MHz interval, may be transmitted by a wireless device that performs trajectory tracking of another wireless device or an object that transports such a wireless device. In another example of some IEEE 802.11 wireless systems, tones of a sample set may be subcarriers transmitted simultaneously in a long training field (LTF) of a packet. The transmitted signals may be reflected by a return device (the device whose trajectory is being estimated) along the same path. A sensor (e.g., antenna) may detect arrival of N returned signals and extract a phase information from these signals, the phase information being representative of the length of the traveled path. Detection of each arriving frequency $f_j$ (referred to as a sub-event herein) generates a corresponding sensing value $r_j$. The set of the sensing values $\{r_j\}$ may be used to obtain the likelihood vector $P_i(d)$ for this specific sensing event (identified by subscript i).

In some instances, N signals reflected by the object may follow multiple, e.g., n, paths, including a path that correspond to the line-of-sight propagation and paths that involve reflections from walls, ceilings, and/or other objects, including multiple reflections. Such paths may be identified, e.g., as multiple maxima of the likelihood tensor that may further allow distinguishing the line-of-sight propagation from multipath reflections, as described below. Numerous implementations are disclosed herein that deploy phase-based ranging for tracking of motion of devices in wireless networks. The advantages of the disclosed implementations include computationally efficient trajectory tracking for fast real-time monitoring of the locations of various objects in wireless network environments, which may include multiple wireless devices and various additional objects.

FIG. 1 illustrates one example setup for trajectory determination and tracking by a wireless device, in accordance with some implementations. A wireless device 100 may be any BT device, BLE device, or any other type of a device capable of generating, transmitting, receiving, and processing electromagnetic sensing signals. In some implementations, the sensing signals may be radio signals in the frequency range of the IEEE 802.11 wireless standard (e.g. 2.4 GHz band, 5 GHz band, 60 GHz band), or any other radio communication band. In some implementations, sensing signals may be compatible with one or more IEEE 802.11 wireless standards. Wireless device 100 may include one or more sensors 102 capable of transmitting and receiving sensing signals. Sensors 102 may include or be communicatively coupled to one or more antennas, such as dipole antennas, loop antennas, multiple-input multiple-output (MIMO) antennas, antenna arrays, or any other type of devices capable of receiving and transmitting electromagnetic signals. Localization system may consist of one or several wireless devices 100. The environment of wireless device 100 may include one or more objects, e.g., object 104, or additional objects not explicitly depicted in FIG. 1. Object 104 may be a wireless device (or may carry or otherwise transport a wireless device) capable of communicating wirelessly with wireless device 100. Although the references below are made to trajectory tracking being performed by wireless device 100, it should be understood that similar techniques and implementations may be used for distance estimation and trajectory determination/tracking performed by object 104, e.g., with trajectory of wireless device 100 (and/or any additional) devices being determined.

Wireless device 100 may generate and transmit a plurality of sensing signals. In some implementations, the sensing signals may have different frequencies (tones). More specifically, wireless device 100 may generate a signal 106-1 that includes multiple (e.g., N) tones, e.g., $f_0$, $f_0+\Delta f_1$, $f_0+\Delta f_2$ . . . , and may transmit the generated signal to object 104, which may be a responding device belonging to the same wireless network as the wireless device 100. The responding device may perform analysis of the received signal 106-1 and evaluate phase information that is used in returned signal 107-1. Wireless device 100 may similarly perform evaluation of phase information of the returned signal 107-1 to estimate the distance between wireless device 100 and the responding device (object 104-1) based on the total phase change. Each tone of the transmitted signal 106-1 (and, correspondingly, of the returned signal 107-1) may carry its own phase information. In particular, the total phase change $\Delta\phi$ associated with the distance $d_1$ between wireless device 100 and object 104 traveled by signal 106-1 and the same distance $d_1$ traveled by returned signal 107-1 of frequency $f_j$ is $\Delta\phi_j=4\pi f_j d_1/c$, where c is the speed of light. This phase change is representative of the distance $d_1(t_1)$ to object 104 at time $t_1$. The callout portion of FIG. 1 illustrates schematically a composition of signal 107-1 (illustrated with dashed lines) that is returned from object 104.

At a later time $t_2$, object 104 may move to a different location 105. A new sensing signal 106-2 (e.g., similarly having N sensing tones $f_j$) may be transmitted by wireless device 100 and may cause a returned signal 107-2 carrying phase information representative of the new distance $d_2(t_2)$ to object 104. As depicted in FIG. 1, an additional returned signal 107-3 may reach sensor(s) 102 of wireless device 100 over a different path that includes reflection from another object, e.g., a wall 108. The distance $d_3(t_2)$ traveled by signal 107-3 may be larger than distance $d_2$ of the line-of-sight propagation. Although one returned signal path is indicated for time $t_1$ and two paths are indicated for time $t_2$, any number of returned signal paths may be present for any detection time (sensing event) $t_i$. Similarly, transmitted signal paths may also include multipath propagation (not depicted in FIG. 1). In some instances, the direct line-of-site path may be blocked by other objects, such that only paths with one or more reflections may be present. As object 104 is moving relative to other objects of the environment, the number of paths may change with time, e.g., may be different at different detection times (sensing events) $t_i$.

The phase changes $\Delta\phi_j$ carried by the returned sensing signals may be exploited using the multiple signal classification (MUSIC) algorithm, generalized cross-correlation (GCC) algorithm, inverse Fourier transform algorithm, or any other suitable processing algorithms that are further improved according to implementations of the present disclosure. The following operations may be performed for each of the sensing events $t_i$ to determine a respective likelihood vector $P_i(d)$, as described below. Likelihood vector $P_i(d)$ may be a vector (array) in a distance space with specific values of the likelihood vector indicating the likelihood (probability or be proportional to probability or has some relation to probability) of various distances to the wireless device that is being tracked. Multiple likelihood vectors $P_i(d)$ may then be combined into a likelihood tensors described in more detail below in conjunction with FIGS. 2-4.

As illustrated in FIG. 1, a sensing event initiated (at each of the detection times $t_i$) by wireless device 100 may include transmitting and then detecting N returned signals (each with a different frequency $f_j$). Each of the detected sensing values $r_j$ may characterize a superposition of waves propagating along n paths; some (or all) of the paths may include one or more reflections.

$$r_j = \left(\sum_{k=1}^{n} a_j(d_k)S_k + n_j\right)\left(\sum_{l=1}^{n} a_j^*(d_l)S_l^* + n_j'\right) j \in [1, N],$$

where $S_k$ represents the amplitude of the wave traveled over k-th path, $n_j$ is the noise associated with forward propagation (and detection) of j-th frequency (tone, channel) $f_j$, $n'_j$ is the noise associated with backward propagation (and detection) of j-th frequency, and $a_j(d)$ is a steering vector (also denoted, in vector notations, as $\hat{a}(d)$) that describes phase change over distance d, which may take one of the values $d=d_1 \ldots d_n$. In particular, for N equidistant sensing tones, $f_j=f_0+(j-1)\Delta f$, the steering vector may have the form, $a_j(d)=\exp[4\pi i(j-1)\Delta f d/c]$.

In MUSIC algorithm implementations, sensing values may be used to construct the N×N covariance matrix, $R_{jl} = \langle r_j r_l^* \rangle$, where the angular brackets $\langle \ldots \rangle$ denote statistical averaging and $r_l^*$ stands for complex conjugation of $r_l$. In some implementations, covariance matrix may be formed using square roots (with suitably chosen sign value) of sensing values, e.g., $R_{jl}=\langle \sqrt{r_j}\sqrt{r_l^*}\rangle$. In some implementations, statistical averaging may be performed using smoothing in the frequency domain, e.g., using smooth-MUSIC algorithm. In some implementations, statistical averaging may include averaging in the time domain, e.g., by collecting multiple instances of data. In some implementations, time averaging is not performed. For uncorrelated noise, $\langle n_j n_l^* \rangle = \delta_{jl}\sigma^2$, where $\sigma^2$ is the noise variance in a single sensing channel.

Covariance matrix $\hat{R}$ may have n signal eigenvectors $\hat{s}_{(1)} \ldots \hat{s}_{(n)}$ and N−n noise eigenvectors $\hat{g}_{(n+1)} \ldots \hat{g}_{(N)}$ (which define what is commonly referred to as the noise subspace).

For uncorrelated noise, noise eigenvectors are orthogonal to the steering vector: $\hat{a}^\dagger(d_m) \cdot \hat{g}_{(\alpha)}=0$, where subscript a enumerates various eigenvectors. Accordingly, the localization vector P(d) (often referred to in MUSIC and GCC applications as the pseudo-spectrum), defined using noise eigenvectors as, $$P^{-1}(d) = \sum_{\alpha=n+1}^{N} |\hat{a}^\dagger(d) \cdot \hat{g}_{(\alpha)}|^2$$

has maxima for the actual distances $d=d_1 \ldots d_n$ of signal propagation, some of which may correspond to direct (line-of-sight) signal propagation and some may correspond to paths that include at least one reflection. In some implementations, the localization vector may be defined using signal eigenvectors, e.g., as $$P(d) = \sum_{\alpha=1}^{n} \lambda_{(\alpha)} |\hat{a}^\dagger(d) \cdot \hat{s}_{(\alpha)}|^2,$$

where $\lambda_{(\alpha)}$ is the eigenvalue corresponding to signal eigenvector $\hat{s}_{(\alpha)}$.

The above example of the MUSIC localization vector is intended to be illustrative. In various implementations, the localization vector P(d) may be obtained using different procedures. For example, in the GCC method, the localization vector may be defined as, $$P(d) = \left|\sum_{j=1}^{N} a_j^*(d) r_j\right|^2.$$

This vector may similarly have maxima for the actual distances $d=d_1 \ldots d_n$, and may be computed using Inverse Fast Fourier algorithm techniques. Numerous other ways of defining the localization vector P(d) are also within the scope of the present disclosure.

Figure 2:
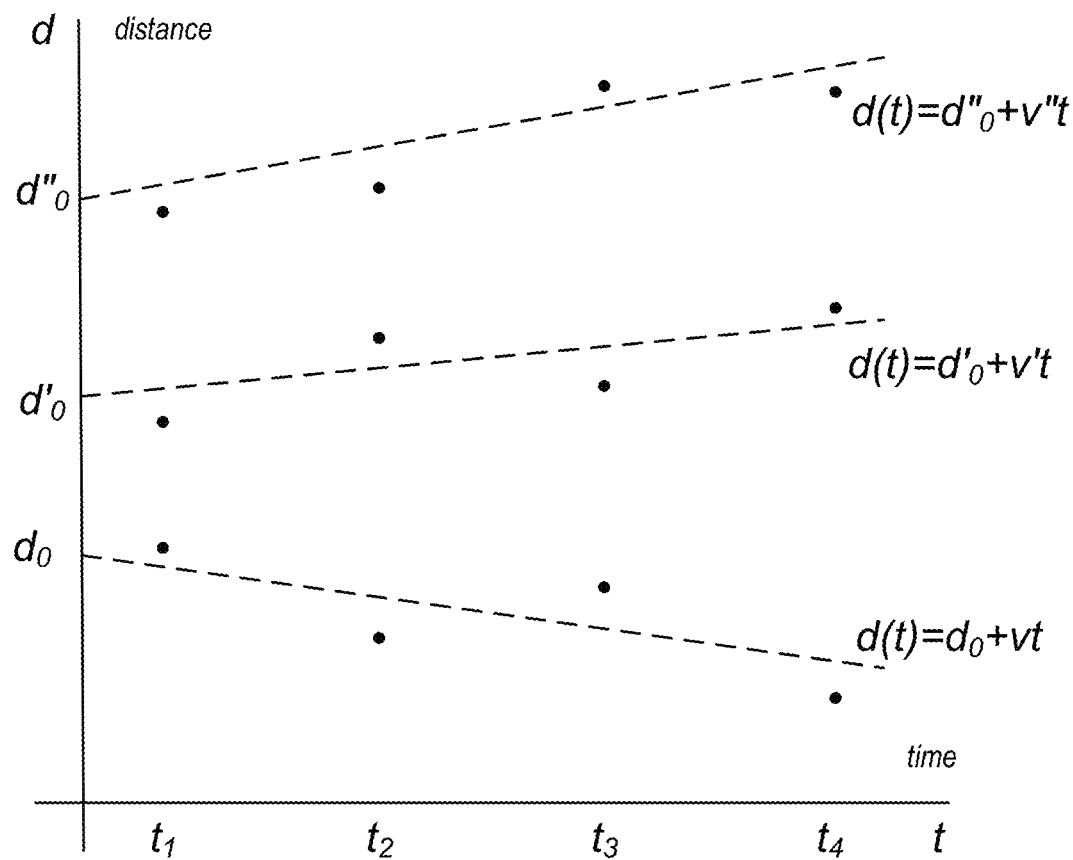
FIG. 2 depicts a distance-time diagram illustrating phase sensing-based disambiguation of trajectories of moving objects in a wireless network, in accordance with some implementations.

FIG. 2 depicts a distance-time diagram illustrating phase sensing-based disambiguation 200 of trajectories of moving objects in a wireless network, in accordance with some implementations. A motion of an object (e.g., object 104 of FIG. 1) may, in some instances, be described with a constant-velocity model, e.g., $$d(t) = d_0 + vt,$$

where d(t) is the distance, at time t, to the object from a sensor (e.g., antenna) of the wireless device and $d_0$ is a reference distance of the object at time t=0 or any suitable instance of time, arbitrarily chosen. FIG. 2 shows sensing data obtained for four sensing events, at respective times $t_1 \ldots t_4$. Each of the sensing events may collect sensing data that determines the respective likelihood vector $P_i(d)$. Because in typical environments propagation of radio signals may occur over multiple paths, each likelihood vector $P_i(d)$ may have multiple maxima, indicated as dots in FIG. 2. The dots may correspond to different trajectories, e.g., $d(t)=d_0+vt$, $d'(t)=d'_0+v't$, $d''(t)=d''_0+v''t$, etc. Association of specific maxima to different trajectories can be ambiguous. To identify parameters of the trajectories ($d_0$, v; $d'_0$, v'; $d''_0$, v") unambiguously, a number of techniques, as described in more detail below, may be used.

In some implementations, a likelihood vector P(d) may be transformed into a likelihood tensor $P(d_0, v)$. The transformation $P(d) \rightarrow P(d_0, v)$ may be performed in a variety of ways. This can be done because of replacement single independent variable by two dependent variables $d \rightarrow d_0, v$ in P(d). In some implementations, the likelihood vectors from multiple sensing events may be joined into the likelihood tensor as follows, $$P(d_0, v) = P_1(d_0 + vt_1) + P_2(d_0 + vt_2).$$

In some implementations, different likelihood vectors may be weighted differently, e.g., $$P(d_0, v) = W_1 P_1(d_0 + vt_1) + W_2 P_2(d_0 + vt_2),$$

with weights $W_1$ and $W_2$, which may be used for normalization of P(d) vector, so, total sum of P(d) is one, e.g., with likelihood vectors corresponding to closer ranges given higher weights. In these formulas, the likelihood vectors are identified with subscripts 1 and 2, to reference the sensing events whose measurements contribute data for the respective likelihood vectors, even though the function that is used to construct each likelihood vector may be the same, e.g., P(d). The likelihood tensor $P(d_0, v)$ is a quantity that is defined on the two-dimensional space of distance $d_0$ and velocity v. The actual values of $d_0$ and v for the object being tracked may be determined by an optimization procedure, e.g., by finding the maxima of $P(d_0, v)$, or, alternatively, the minima of $P^{-1}(d_0, v)$. Although two likelihood vectors are combined in this example, any number of likelihood vectors may be combined in a similar fashion.

Figure 3A:
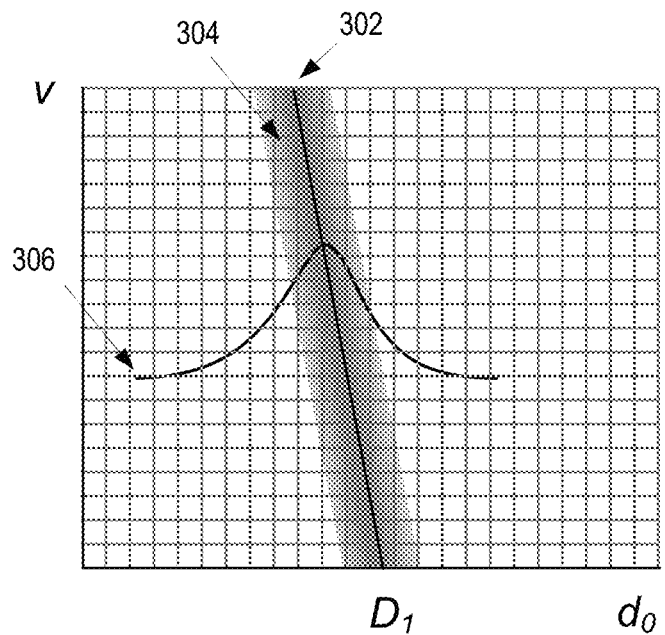
FIGS. 3A-B illustrate the process of optimization of a likelihood tensor, in accordance with some implementations.
Figure 3B:
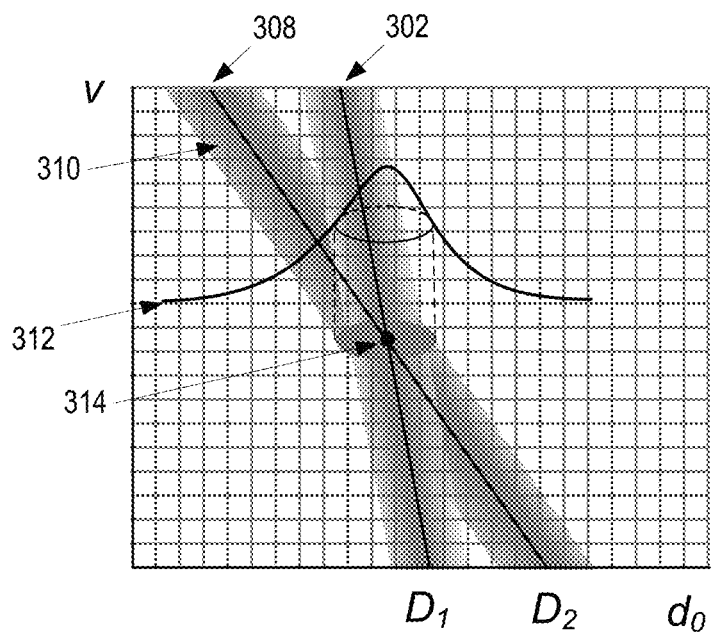

FIGS. 3A-B illustrate the process of optimization of the likelihood tensor, in accordance with some implementations. FIG. 3A depicts a grid in the location-velocity space $d_0, v$, with each element (square) of the grid being associated with a corresponding value of the likelihood tensor obtained after two sensing events. It may be determined, e.g., by location-velocity estimator 110 (of FIG. 1), that the optimum value of $P_1(d_0 + vt_1)$ is at $d_0 + vt_1 = D_1$. This equation defines a line 302 whose intercept with the horizontal (distance do) axis is $D_1$ and whose tangent is $\Delta v/\Delta d_0 = -1/t_1$. Also depicted is the shaded area 304 where the object is likely to be located. Curve 306 represents schematically the likelihood vector $P_1(d_0, v)$ near line 302, with a maximum along the line 302. Being dependent on the reference distance $d_0$ and velocity v in combination $d_0 + vt_1$, the value $P_1^{-1}(d_0 + vt_1)$ may have the form of a ridge that is parallel to the line 302 and has the same (or approximately the same) width.

FIG. 3B illustrates processing of additional data obtained for the second sensing event at time $t_2$. The additional contribution, $P_2(d_0 + vt_2)$, constructed with the new sensing data, taken alone, would have the optimum value at $d_0 + vt_2 = D_2$. This equation defines a new line 308 whose intercept with the horizontal (distance do) axis is $D_2$ and whose tangent is $\Delta v/\Delta d_0 = -1/t_2$. The new line 308 is associated with the corresponding uncertainty area 310. When both the original contribution $P_1(d_0 + vt_1)$ and the new contribution $P_2(d_0 + vt_2)$ are combined into the likelihood tensor $P(d_0, v)$ (e.g., as the harmonic average, as indicated by the equation above), the likelihood tensor $P(d_0, v)$ will have the maximum at the intersection of lines 302 and 308, as depicted in FIG. 3B. Being dependent on the reference distance $d_0$ and velocity v via two combinations $d_0 + vt_1$ and $d_0 + vt_2$, the likelihood tensor $P(d_0, v)$ may have the form of a peak 312 that is centered near a point 314 in the location-velocity space $d_0, v$ that identifies likely values of the reference distance $d_0$ and velocity v.

The above process may continue with the additional sensing data for each new sensing event, i=3, 4, . . . , being used to update the likelihood tensor using a new likelihood vector $P_i(d_0 + vt_i)$:

$$P(d_0, v) \rightarrow P(d_0, v) + W_i \cdot P_i(d_0 + vt_i),$$

In some implementations, the number of sensing events that are counted towards the likelihood tensor may be limited to a predetermined number M of sensing events, such that after M contributions into the likelihood tensor are collected, when each additional contribution is added, the earliest contribution is subtracted from the likelihood tensor (e.g., the i=1 contribution in this example):

$$P(d_0, v) \rightarrow P(d_0, v) + W_{M+1} \cdot P_{M+1}(d_0 + vt_i) - W_1 \cdot P_1(d_0 + vt_i).$$

The number M may be selected to include multiple sensing events but still be small enough so that the velocity of the object is unlikely to change substantially over the duration of the last M sensing events. For example, if one sensing event occurs every 0.1 sec, the maximum number of events included in the likelihood tensor may be M=10. As a result, the optimization of the likelihood tensor provides an accurate estimate of the average velocity (and reference distance) to the object over the sliding window of the last 0.5 sec, which under many practical conditions may be short enough for the constant velocity model to be sufficiently accurate.

In the implementation described above, the likelihood tensor for a combination of events is the harmonic mean of the likelihood vectors for each event, $P = P_1 + P_2 + \ldots$ . In some implementations, the likelihood tensor for a combination of events may instead be the sum of likelihood vectors computed for each event, $= P_1 + P_2 + \ldots$ , or any other suitable measure. In some implementations, e.g., where different sensing events have unequal number of sub-events, the likelihood vectors computed for individual events may be weighed with suitably chosen weights, e.g., weights proportional to the number of sub-events in each sensing event, weights that are empirically determined, and so on.

Figure 4A:
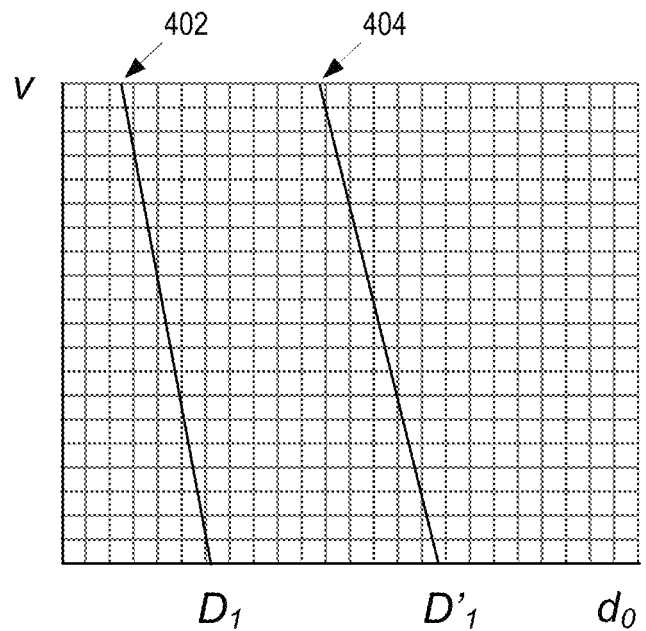
FIGS. 4A-B illustrate the application of trajectory determination and tracking in the presence of multipath transmission and reflection, in accordance with some implementations.
Figure 4B:
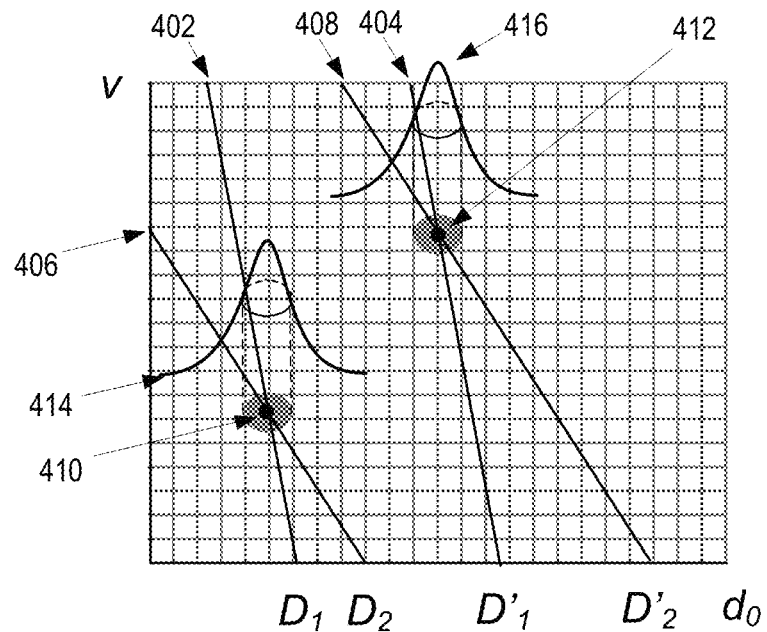

FIGS. 4A-B illustrate the application of trajectory determination and tracking in the presence of multipath transmission and reflection, in accordance with some implementations. In the presence of multipath propagation, each of the likelihood vectors $P_i(d_0 + vt_i)$ may have a number of local maxima (or, more generally, extrema). For example, as depicted in FIG. 4A, the likelihood vector for the first sensing event $P_1(d_0 + vt_i)$ may have multiple maxima, e.g., along a line 402, described by the equation $d_0 + vt_i = D_1$, along a line 404, described by the equation $d_0 + vt_i = D'_1$, and so on. Only two lines are shown for conciseness and ease of illustration, but any number of local extrema may be identified.

As depicted in FIG. 4B, additional sensing events may allow constructing additional likelihood vectors using the new sensing data, e.g., $P_2(d_0 + vt_2)$, as described above, $P_3(d_0 + vt_3)$, etc. The maxima of the new likelihood vector(s) may be along a line 406, e.g., $d_0 + vt_2 = D_2$, along a line 408, e.g., $d_0 + vt_2 = D'_2$, and so on. When both the first likelihood vector $P_1(d_0 + vt_i)$ and the second likelihood vector $P_2(d_0, v)$ are combined into the likelihood tensor $P(d_0, v)$, the likelihood tensor may have two (three, etc.) maxima at the intersection 410 of lines 402 and 406, and the intersection 412 of lines 404 and 408. The combined likelihood tensor $P(d_0, v)$ may have multiple peaks, e.g., peaks 414 and 416 that are centered near the respective line intersections. In some instances, e.g., where the line-of-sight path is available, the peak associated with the lowest distance (e.g., intersection 410 in FIG. 4B) may correspond to the actual distance to the object whereas other peaks may correspond to images of the object created by reflections (including multiple reflections) from walls, ceilings, or any other bodies. In some instances, e.g., where the direct line-of-sight path is blocked, all peaks may correspond to images created by reflections.

In the above examples, the location-velocity determination and tracking is illustrated using the two-dimensional (2D) likelihood tensor $P(d_0, v)$ in location-velocity space. Similar techniques may be used for trajectory determination and tracking in higher dimensions, where multiple coordinates of the object and multiple components of velocity are being determined. For example, in the more general case, the trajectory may be determined using a vector model, $\vec{r} = \vec{r}_0 + \vec{v} t$, with a vector reference location, $\vec{r}_0 = (x_0, y_0 \ldots)$ and a vector velocity $\vec{v} = (v_x, v_y \ldots)$, where x, y . . . are any suitable coordinates including Cartesian coordinates, polar coordinates, elliptical coordinates, spherical coordinates, cylindrical coordinates, and so on. A higher-dimensional (HD) likelihood tensor may be a tensor in 2m-dimensional space of m (e.g., m=2 or m=3) coordinates x, y . . . and m velocity components, $v_x, v_y$ . . . . More specifically, the likelihood tensor may be $$P(\vec{r}_0, \vec{v}) = \sum_{\text{Last } M \text{ events}} W_i P_i(|\vec{r}_0 + \vec{v} t_i|).$$

Figure 5A:
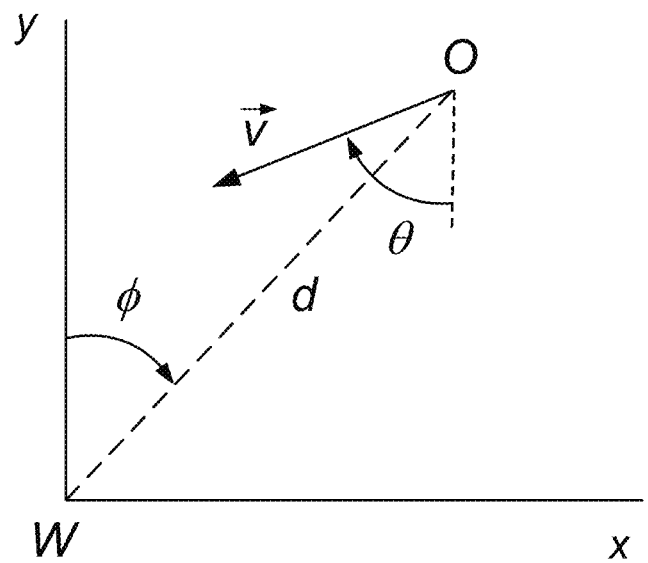
FIG. 5A illustrates two-dimensional trajectory determination and tracking of an object by the wireless device located at the origin of the Cartesian coordinates.

FIG. 5A illustrates planar trajectory determination and tracking of object O by the wireless device W located at the origin of the Cartesian coordinates x-y. Also shown are the polar coordinates that may be used in some implementations. For example, if the Cartesian coordinates are used, $$|\vec{r}_0 + \vec{v} t_i| = \sqrt{(x_0 + v_x t_i)^2 + (y_0 + v_y t_i)^2}.$$

Correspondingly, the HD likelihood tensor $P(\vec{r}_0, \vec{v})$ is a tensor in the 4-dimensional space, $P(x_0, y_0; v_x, v_y)$ whose extrema determine the locations of the objects or images of the objects created by reflections from various bodies in the environment. In the instances of reflections, the apparent locations of the objects $\vec{r}_0 + \vec{v} t_i$ may be behind the reflecting bodies. If polar coordinates are being used, the elements of the steering matrix may be approximated with $$|\vec{r}_0 + \vec{v} t_i| = d_0 - v t_i \cos(\theta - \phi_0),$$

where $d_0$ and $\phi_0$ are reference distance and azimuthal angle, and v and θ are the absolute value and the direction of velocity, respectively. Correspondingly, the HD likelihood tensor is a tensor in the four-dimensional space of polar coordinates $P(r_0, \phi_0; v, \theta)$; its extrema determine the locations of the objects (or images) in substantially the same way as described above.

The transformations described above, e.g., from individual likelihood vectors, which characterize individual sensing events, to 2D likelihood tensors, $P(d) \rightarrow P(d_0, v)$, or from likelihood vectors to HD likelihood tensors, $P(d) \rightarrow P(\vec{r}_0, \vec{v})$, may be performed using various interpolation techniques to reduce computational costs and memory use. For example, a 2D likelihood tensor $P(d_0, v)$ may be defined on a discrete set of distances $\{d_0\}$ and a discrete set of velocities $\{v\}$. The corresponding set of values $\{P(d_0, v)\}$ may include a large number of the likelihood tensor elements for various possible combinations of distances and velocities. To optimize computations, elements of the likelihood vectors and tensors may be computed for some values of distances and velocities, e.g., sparsely distributed values, while the remaining elements may be obtained by interpolation methods, e.g., using linear interpolation, polynomial splines, or any other suitable methods.

In one specific non-limiting example, after a set of new sensing values for sensing time $t_i$ is detected, location-velocity estimator 110 may compute a new likelihood vector $P_i(d)$ (or $P_i^{-1}(d)$) for a discrete set of values $d_s = c + s\Delta d$, with the starting value c, the step $\Delta d$, and s=0, 1, 2 . . . . Subsequently, the computed likelihood vectors $P_i(d_s)$ may be used to populate a denser array of values of the likelihood tensor $P_i(d_0, v=0)$, e.g., the bottom row of cells in FIGS. 3A-B and FIGS. 4A-B. More specifically, each pair of values $P_i(d_s)$ and $P_i(d_s+1)$ may be used to populate (via interpolation) one or more intermediate values of $P_i(d_0, v=0)$ with $d_0$ having multiple values within the interval of distances $\Delta d$, such that the interval $\Delta d$ is split into one or more (e.g., p) smaller sub-intervals $\Delta d/p$. The other rows of cells of the likelihood tensor $P_i(d_0, v \neq 0)$ may similarly be populated by interpolating from the original values $P_i(d_s)$ or from the values of the neighbor (e.g., preceding) row of the already populated cells. Each subsequent update of the likelihood tensor $P_i(d_0, v)$ (or $P_i^{-1}(d_0, v)$) may then be performed similarly, based on the discretized and interpolated values of new likelihood vectors $P_{i+1}(d)$, $P_{i+2}(d)$, etc. (or $P_{i+1}^{-1}(d)$, $P_{i+2}^{-1}(d)$, etc.). Although the above example, for brevity and conciseness, illustrates populating a planar grid of elements for a 2D likelihood tensor, similar interpolation techniques may be used to populate any multi-dimensional grid of a HD likelihood tensor $P(\vec{r}_0, \vec{v})$ (or $P^{-1}(\vec{r}_0, \vec{v})$), which may be a four-dimensional tensor (if planar motion is being tracked), a six-dimensional tensor (if the motion is non-planar), and the like. The use of interpolation techniques allows to achieve high resolution of the location-velocity grid using simple arithmetic operation (e.g., linear splines), without the need to perform complex MUSIC or GCC computations of additional values of the likelihood vectors.

In some implementations, interpolation techniques may be used to reduce the amount of memory required to store the 2D likelihood tensor $P_i(d_0, v)$ and/or HD likelihood tensor $P(\vec{r}_0, \vec{v})$. For example, only the values $P_i(d_s)$ may be stored in memory whereas the values of $P_i(d_0, v)$ and/or $P_i(\vec{r}_0, \vec{v})$ may be computed on-the-fly when the corresponding values are being updated or used for trajectory estimation.

Figure 5B:
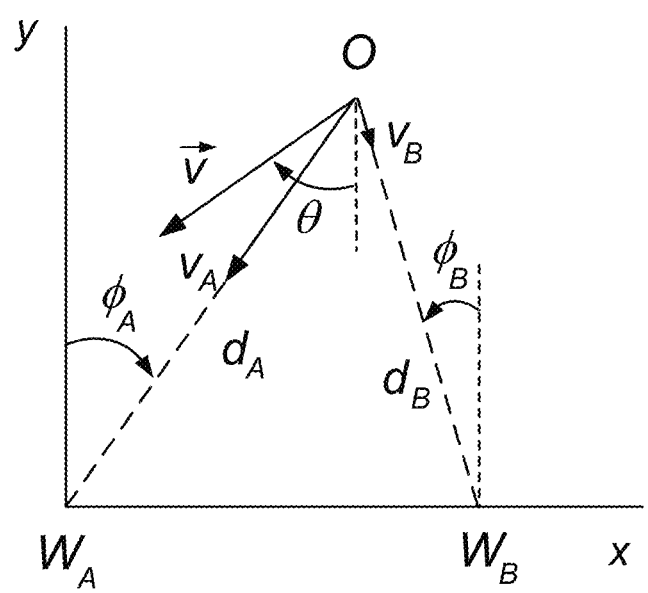
FIG. 5B illustrates trajectory determination and tracking of an object using sensing data obtained by multiple wireless devices.

FIG. 5B illustrates trajectory determination and tracking of objects using sensing data obtained by multiple wireless devices, e.g., wireless devices $W_A$ and $W_B$. FIG. 5B depicts a triangulation setup in which wireless devices $W_A$ and $W_B$ are positioned at different locations in space such that determination of distances ($d_A$ and $d_B$) from object O to the respective wireless device ($W_A$ and $W_B$) allows to more accurately estimate the coordinates of the object. Each device may observe object W in the frame of reference of the respective object. As a result, apparent locations of object W may be offset in different reference frames, e.g., as a shift along one or more Cartesian coordinates. In a single frame of reference the relative offset may be removed (subtracted).

Figure 5C:
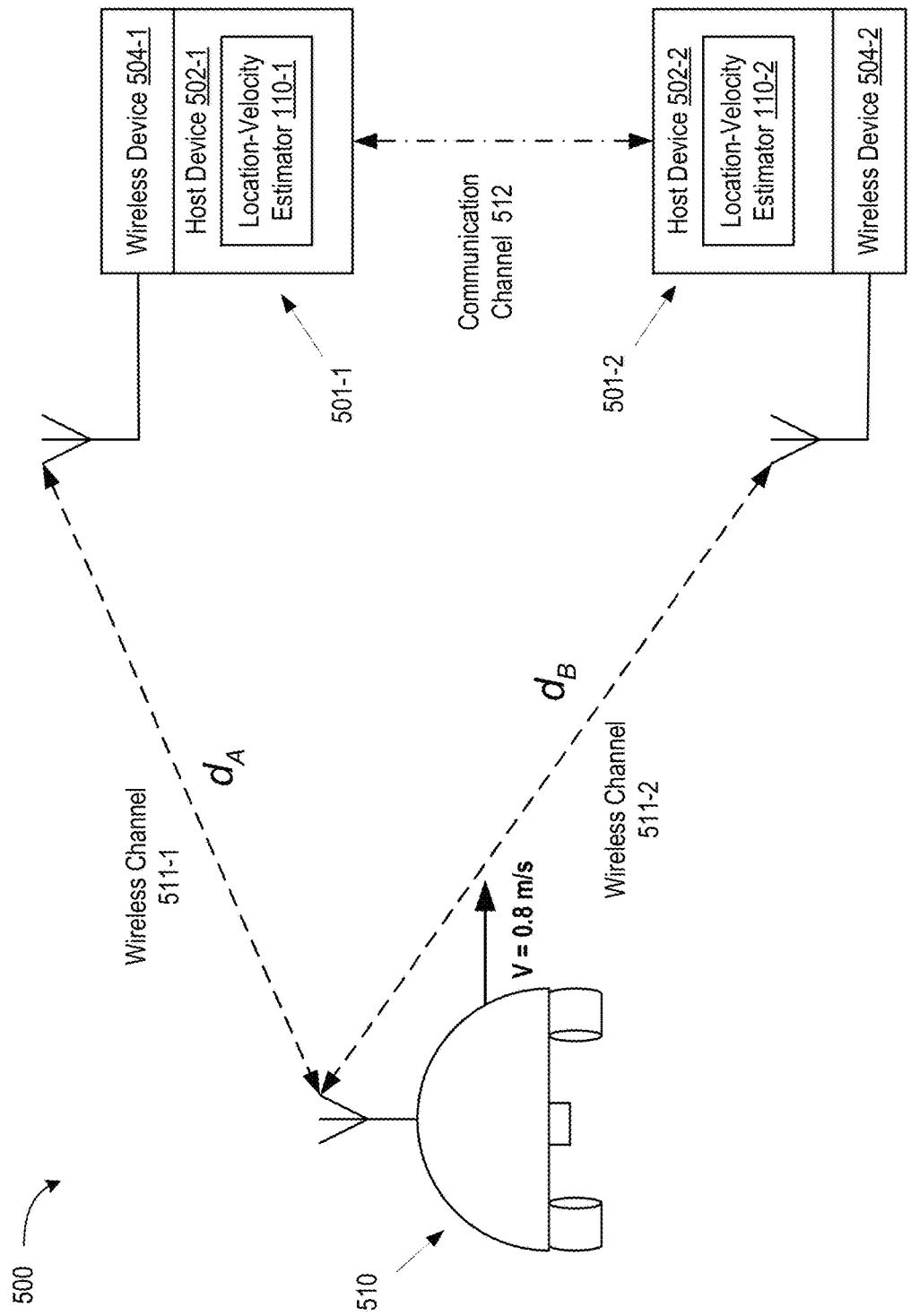
FIG. 5C illustrates a wireless system architecture for trajectory determination and tracking of objects, in accordance with some implementations.

FIG. 5C illustrates a wireless system architecture 500 for trajectory determination and tracking of objects, in accordance with some implementations. Multiple sensing stations 501-$n$ may be used for identifying a location of an object 510 (e.g., a vacuum cleaner, a phone, a key fob, a tablet computer, etc.) and its velocity. Two sensing stations (501-1 and 501-2) are shown for conciseness, but the number of sensing stations need not be limited to two and may be arbitrary. Each sensing station 501-$n$ may include a host device 502-$n$ and a wireless device 504-$n$. Each sensing station 501-$n$ may operate a location-velocity estimator 110-$n$ capable of performing techniques described in the present disclosure. Although location velocity estimators 110-1 and 110-2 are shown as operating on the respective host device 502-$n$, in some implementations, location velocity estimator 110-1 and/or location velocity estimator 110-2 may be operating on the respective wireless device 504-$n$. Each wireless device 504-$n$ may have an established wireless channel 511-$n$ (e.g., BT, BLE, WLAN, etc.) channel with the object 510 and may receive sensing data representative of the distances $d_A$ and $d_B$. Sensing stations 501-1 and 501-2 may also have an established communication channel 512, which may be a wireless or a wired communication channel, to exchange collected sensing data and/or information obtained from sensing data, such as likelihood vectors, likelihood tensors, and the like. In some implementations, object 510 may determine locations of stations 501-1 and 501-2 relative to object 510 and then determine its own location in space, e.g., based on known locations of stations 501-1 and 501-2.

Figure 6A:
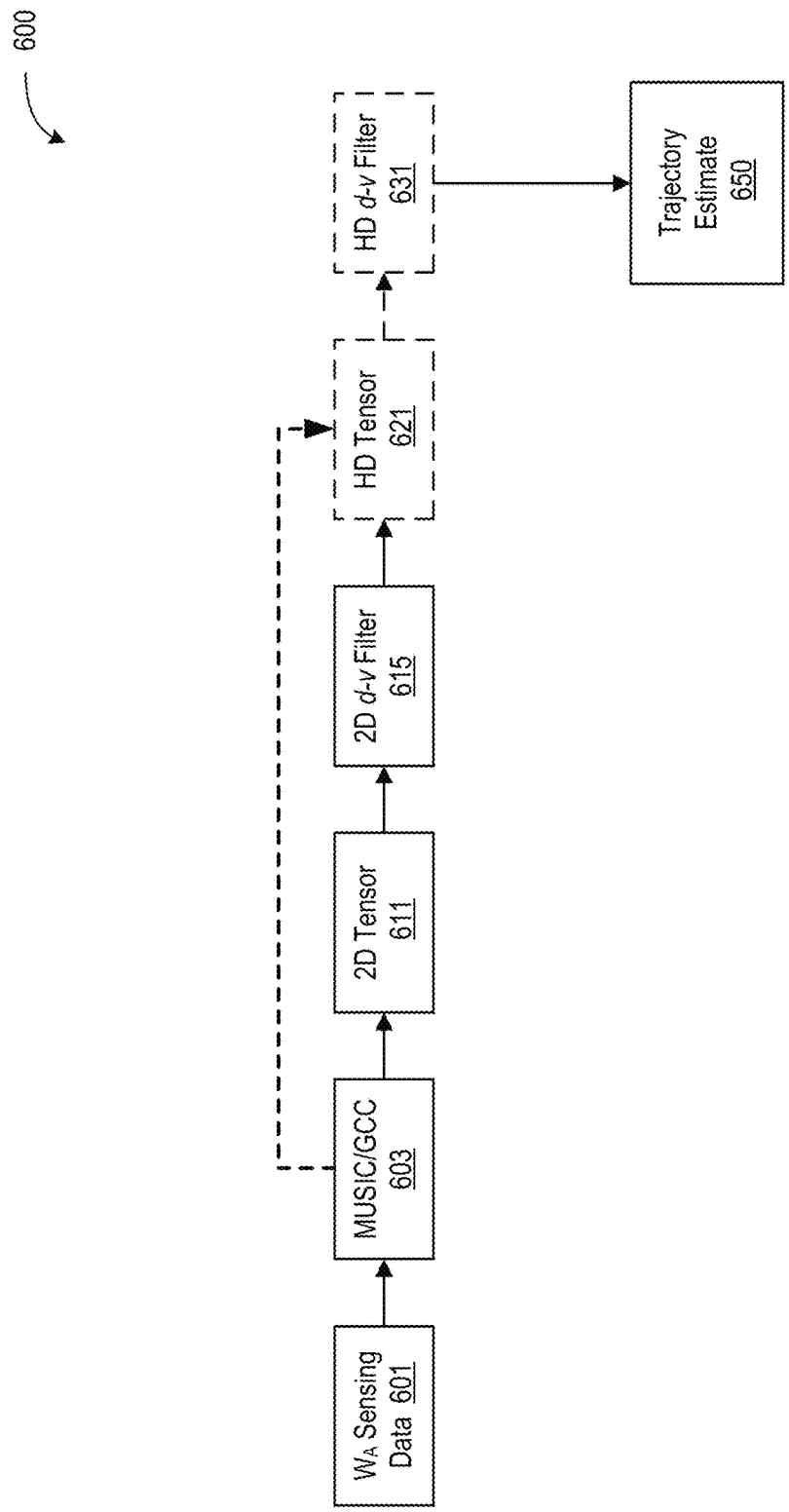
FIG. 6A illustrates example flow of operations during distance-based trajectory determination and tracking using a single sensing station, in accordance with some implementations.
Figure 6B:
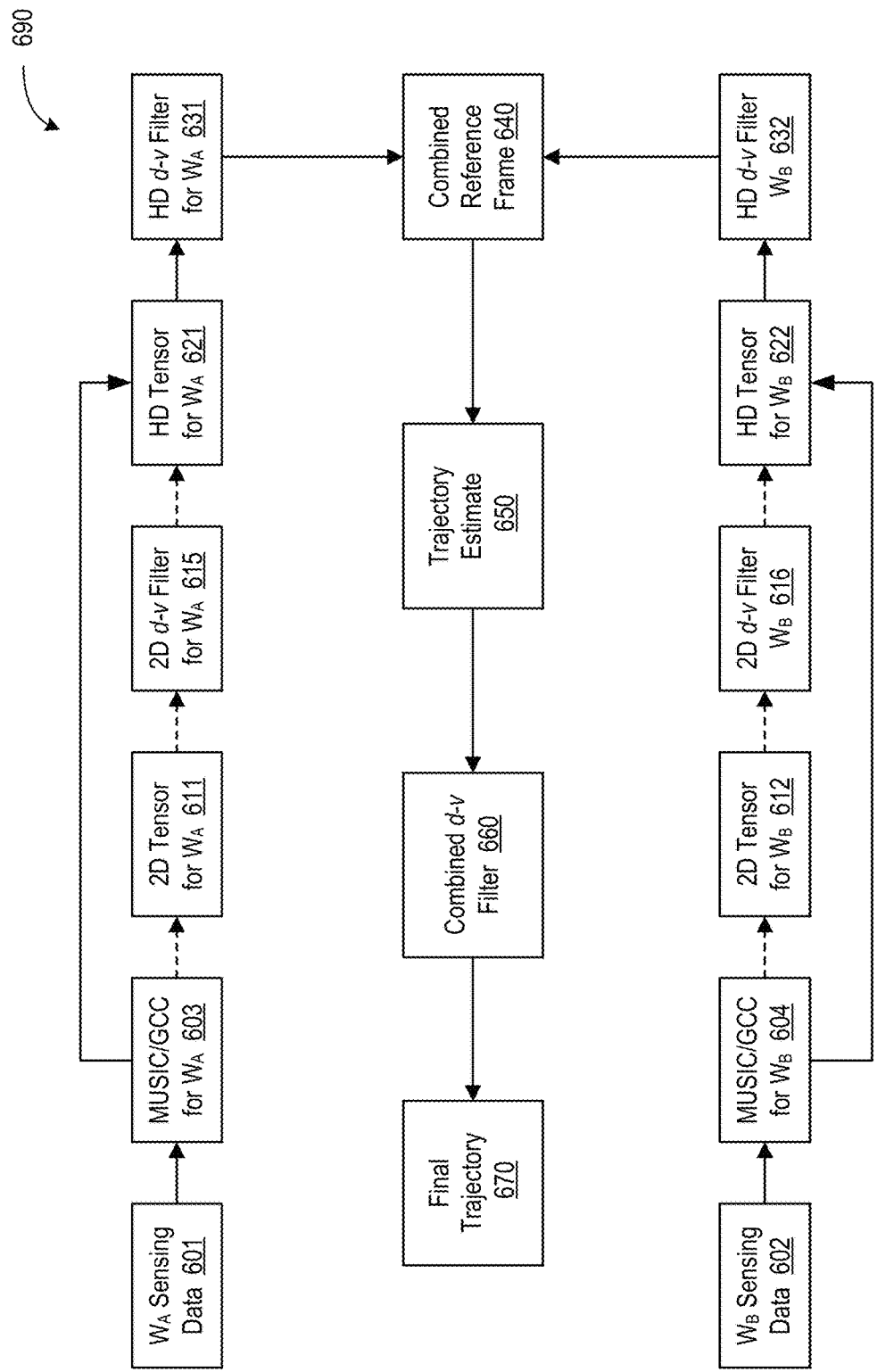
FIG. 6B illustrates example flow of operations during distance-based trajectory determination and tracking using multiple sensing stations, in accordance with some implementations.

FIG. 6A illustrates example flow of operations 600 during distance-based trajectory determination and tracking using a single sensing station, in accordance with some implementations. FIG. 6B illustrates example flow of operations 690 during distance-based trajectory determination and tracking using multiple sensing stations, in accordance with some implementations.

As depicted in FIG. 6A, a wireless device (e.g., wireless devices $W_A$) may collect sensing data (block 601) representative of the current distances $d(t_i)$ to the object being tracked. The wireless device may then generate the 2D likelihood tensor (as described above). For example, the wireless device may obtain at block 603 a set of likelihood vectors $P_i(d)$ using MUSIC, GCC, Inverse Fast Fourier Transform, or any other suitable algorithm. The wireless device may then construct, at block 611, the 2D likelihood tensor $P(d_0, v)$. The 2D likelihood tensor may be constructed according to any techniques described above, e.g., using the discretization and interpolation techniques.

The wireless device may optionally (as depicted with the corresponding dashed boxes) construct, at block 621, the HD likelihood tensor, $P(\vec{r}_0, \vec{v})$. In some implementations, the HD likelihood tensors may have four dimensions, if the trajectory is two-dimensional (a planar motion), or six dimensions, if the trajectory is three-dimensional. The 2D likelihood tensor $P(d_0, v)$ or the HD likelihood tensor $P(\vec{r}_0, \vec{v})$ may be used to estimate the trajectory (block 650) of the object, by finding one or more extrema of the respective likelihood tensor.

In some implementations, additional filtering may be performed to increase accuracy of trajectory determination and tracking, as enabled by location-velocity (d-v) filters 615 and 631. Filtering may involve combining measurement (sensing) data, e.g., newly determined likelihood vectors and/or tensors, with any suitable model predictions of dynamics of these likelihood vectors and/or tensors. Filtering may further use estimated statistics of the likelihood vectors and/or tensors. Filtering may include estimating the probable actual values of the likelihood tensors by selecting a suitable (e.g., empirically-chosen) set of weights used to weight relative importance that is placed on model predictions versus measurement data. Filtering may include applying a 2D location-velocity filter 615 to 2D likelihood tensor $P(d_0, v)$ and/or applying an HD location-velocity filter 631 to for HD likelihood tensor $P(\vec{r}_0, \vec{v})$, e.g., in the instances where the HD likelihood tensor is being used. In some embodiments, more than one filter may be used (e.g., both the 2D location-velocity filter 615 the HD location-velocity filter 631). Operations of the filters are described in more detail below.

Numerous variants of operations 600 may be implemented. In some implementations, HD likelihood tensor may be generated, at block 621, directly from likelihood vectors (obtained at block 603) without the intermediate operations of generating, at block 611, the 2D likelihood tensor (as well as filter 615, which is described in more detail below), as depicted with dashed arrow in FIG. 6A. In some implementations, this may be performed as follows. A set of elements $P_i(d_s)$ computed based on the sensing data (e.g., using MUSIC, GCC, etc.) collected during a sensing event at time $t_i$ may be used to determine the corresponding values of the HD likelihood tensor $P_i(\vec{r}_0, \vec{v})$ on the hypersurfaces $d_s = |\vec{r}_0 + \vec{v} t_i|$ in the 2m-dimensional location-velocity ($\vec{r}_0$-$\vec{v}$) space. Additional values of the HD likelihood tensor $P_i(\vec{r}_0, \vec{v})$, including the values on the discrete $\vec{r}_0$-$\vec{v}$ grid of cells, may then be obtained by interpolating from the values $P_i(d_s)$ that the HD likelihood tensor $P_i(\vec{r}_0, \vec{v})$ takes on the corresponding hypersurfaces $d_s = |\vec{r}_0 + \vec{v} t_i|$. In some implementations, interpolation may be performed from the closest hypersurfaces to a given cell of the $\vec{r}_0$-$\vec{v}$ grid.

As depicted in FIG. 6B, when multiple sensing stations are deployed for trajectory determination and tracking, each of the wireless devices (of the respective sensing station) may collect its own sensing data (blocks 601, 602) representative of the current distances $d_A(t_i)$ and $d_B(t_i)$ from the object to wireless devices $W_A$ and $W_B$, respectively. Each wireless device may then generate its corresponding 2D likelihood tensor (as described above). For example, wireless device $W_A$ (and, similarly, wireless device $W_B$) may obtain at block 603 (and, similarly, block 604) a set of likelihood vectors $P_A(d_A)$ (and, similarly, $P_B(d_B)$), using MUSIC, GCC, Inverse Fast Fourier Transform, or any other suitable algorithm. Wireless device $W_A$ (and, similarly, wireless device $W_B$) may then construct, at block 611, 2D likelihood tensor $P_A(d_{A0}, v_A)$ and wireless device $W_B$ may construct, at block 612, likelihood tensor $P_B(d_{B0}, v_B)$. Each 2D likelihood tensor may be constructed according to any techniques described above, e.g., using the discretization and interpolation techniques.

Each wireless device may then construct a respective HD likelihood tensor. More specifically, e.g., wireless device $W_A$ may construct, at block 621, HD likelihood tensor $P_A(\vec{r}_{0A}, \vec{v}_A)$ and wireless device $W_B$ may construct, at block 622, HD likelihood tensor $P_B(\vec{r}_{0B}, \vec{v}_B)$. In some implementations, the HD likelihood tensors may have four dimensions, if the trajectory is two-dimensional (if only planar motion is being tracked), or six dimensions, if the trajectory is three-dimensional. Separate HD likelihood tensors may subsequently be joined into a combined (C) tensor $P_C(\vec{r}_0, \vec{v})$, using any suitable coordinate transformations (block 640) to transform coordinates and velocity from the reference frame of wireless device $W_A$ to some common reference frame, e.g., $d_{A0}$, $\phi_A$; $v_A$, $\theta_A \to x_0$, $y_0$; $v_x$, $v_y$, and similarly transform the coordinates and velocity from the reference frame of wireless device $W_B$ to the same common reference frame, $d_{B0}$, $\phi_B$; $v_B$, $\theta_B \to x_0$, $y_0$; $v_x$, $v_y$. Although in this example, the common reference frame uses Cartesian coordinates, any other system of coordinates may alternatively be used, including a reference frame of one of the objects, e.g., of wireless device $W_A$. In such implementations, only the transformation from the reference frame of wireless device $W_B$ may have to be performed for tensor $P_B(\vec{r}_{OB}, \vec{v}_B)$, e.g., using a relative shift $r_{AB}$ between the two reference frames, $P_B(\vec{r}_{OB}, \vec{v}_B) \to P_B(\vec{r}_{OB} + \vec{r}_{AB}, \vec{v}_B)$. After the higher-dimensional tensors are expressed in the combined reference frame, both tensors may be used to obtain a combined tensor, e.g., $P_C = P_A + P_B$, and the combined likelihood tensor $P_C$ may be used to estimate the trajectory (block 650) of the object, e.g., by finding one or more extrema of the combined likelihood tensor $P_C$.

Similarly to FIG. 6A, as indicated with the dashed arrow in FIG. 6B, in some implementations HD likelihood tensors may be generated, at blocks 621 and/or 622, directly from likelihood vectors (obtained at blocks 603 and/or 604) without the intermediate operations of generating 2D likelihood tensors at blocks 611 and/or 612 (as well as corresponding filters 615 and/or 616, which are described in more detail below).

In some implementations, additional filtering may be performed to increase accuracy of trajectory determination and tracking, as indicated by various location-velocity (d-v) filters 615-616, 631-632, and 660. Filtering may involve combining measurement (sensing) data, e.g., newly determined likelihood vectors and/or tensors, with any suitable model predictions of dynamics of these likelihood vectors and/or tensors. Filtering may further use estimated statistics of the likelihood vectors and/or tensors. Filtering may involve estimating the probable actual values of the likelihood tensors by selecting a suitable (e.g., empirically-chosen) set of weights to assign a relative importance of model predictions and measurement data. Filtering may include applying 2D location-velocity filters 615 and 616 to the 2D likelihood tensors, applying HD location-velocity filters 631 and 632 to the HD likelihood tensors, applying a combined location-velocity (d-v) filter 660 to the combined likelihood tensor, or applying any combination thereof. In some embodiments, only one (or a pair) of location-velocity filters may be used, e.g., a combined location-velocity filter 660 (or a pair of HD location-velocity filters 631 and 632). In some embodiments, more than one location-velocity filter may be used.

Location-velocity filters may be or include Kalman filters, finite impulse response (FIR) filters, infinite impulse response (IIR) filters, particle filters, or any combination thereof. In one illustrative example, a Kalman filter may be applied to elements of the 2D and/or likelihood tensors of each cell of the location-velocity space. In some implementations, each element (cell) of the location-velocity space may be filtered independently of other elements. More specifically, a state of a particular tensor element (cell) at time $t_i$ in the constant rate of change model may be represented as a vector $\hat{x}(t_i)$, e.g., $\hat{x}^T(t_i) = (P(t_i), \dot{P}(t_i))$, where $P(t_i)$ is the current value of the cell and $\dot{P}(t_i)$ its rate of change.

The evolution of the state from a previous instance of time $\hat{x}(t_{i-1})$ may be predicted from the difference equation, $$\hat{x}(t_i) = \hat{F}\hat{x}(t_{i-1}),$$

where $\hat{F}$ is a state-transition matrix, e.g., $$\hat{F} = \begin{bmatrix} 1 & \Delta t \\ 0 & 1 \end{bmatrix},$$

Measured (sensed) values may be described by a vector $\hat{z}^T(\tau) = (P_m(t_i), 0)$. The measurement vector $\hat{z}(\tau)$ is determined by the state vector, $$\hat{z}(t_i) = \hat{H}\hat{x}(t_i) + \hat{n},$$

in terms of a measurement matrix $\hat{H}$ (which may be taken as a unit matrix), up to random measurement noise $\hat{n}$.

In some implementations, tracking the element of the tensor may include predicting the state vector $\hat{x}(t_i)$ from the estimate at the previous time $\hat{x}(t_{i-1})$, obtaining actual measurement data $\hat{z}(t_i)$, identifying the difference with the expected measurement data, $\hat{z}(t_i) - \hat{H}\hat{x}(t_i)$, based on the estimated state, and improving (as indicated by the primed values) the estimate of the state vector using the Kalman gain, K, $$\hat{x}'(t_i) = \hat{x}(t_i) + \hat{K}(t_i)[\hat{z}(t_i) - \hat{H}\hat{x}(t_i)],$$

by a correction that is weighted by the Kalman gain difference between the actual measurement and the predicted value. The Kalman gain is selected to minimize the error (mean square deviation) between the predicted value and the actual value of the state vector, which may be achieved by choosing, $$\hat{K}(t_i) = (\hat{H}\hat{S}(t_i)\hat{H}^T + \hat{R})^{-1}\hat{S}(t_i)\hat{H}^T,$$

where $\hat{S}(t_i)$ is the error covariance matrix and $\hat{R}$ is a measurement noise covariance matrix. In addition to estimating the state vector $\hat{x}(t_i)$, the Kalman filtering may also include predicting the estimate of the error covariance matrix $$\hat{S}(t_i) = \hat{F}\hat{S}(t_{i-1})\hat{F}^T.$$

The predicted estimate of the error covariance matrix is further improved by the Kalman gain, $$\hat{S}'(t_i) = (1 - \hat{K}(t_i)\hat{H})\hat{S}(t_i).$$

At each time increment, when new measurement data becomes available, Kalman filtering (e.g., combined d-v filter 660) may include generating a new expected state vector $\hat{x}(t_i)$, based on the previous estimate $\hat{x}(t_{-1})$, obtaining a measurement vector $\hat{z}(t_i)$, obtaining an improved estimate of the state vector $\hat{x}'(t_i)$ using the Kalman gain matrix $\hat{K}(t_i)$, retrieving an error covariance matrix $\hat{S}(t_i)$, obtaining an improved covariance matrix $\hat{S}'(t_i)$, and generating the new covariance matrix for the next iteration $t_i$, based on the improved covariance matrix and using the state-transition matrix. The described procedure may be continued until the trajectory of the object is being tracked (e.g. until the object leaves the environment). The filtered values of the combined HD likelihood tensor may be used to obtain, at block 670, the final estimate of the trajectory $\vec{r}(t) = \vec{r}_0(t) + \vec{v}t$.

The above illustration of a Kalman filter is intended as an illustration only. Numerous other filtering algorithms and techniques may be used instead. For example, in some implementations the state vector may include and track not only the cell's value and its rate of change, but also its second (third, etc.) time derivative, e.g., $\hat{x}^T = (P, \dot{P}, \ddot{P})$.

Although FIG. 6 illustrates determination of an object's trajectory with two wireless devices ($W_A$ and $W_B$), in some implementations any other number of wireless devices (e.g., three, four, etc.) may be used for this purpose. In such implementations, more than two HD likelihood tensors (constructed using sensing data collected by multiple wireless devices) may be used to construct the combined HD likelihood tensor which may then be processed as described above.

In some implementations, collection of sensing data (blocks 601, 602) as well as processing corresponding to blocks 603-631 and 604-632 may be performed on the corresponding wireless device before the obtained likelihood tensors are joined on a single device, which may be wireless device $W_A$, wireless device $W_B$, or any additional device. In some implementations, collection of sensing data (blocks 601, 602) may be performed on the corresponding wireless device (e.g., $W_A$ and/or $W_B$) while the processing corresponding to blocks 603-631 and 604-632 (or any part of it) may be performed on a single device, which may be wireless device $W_A$, wireless device $W_B$, or any additional device.

Figure 7A:
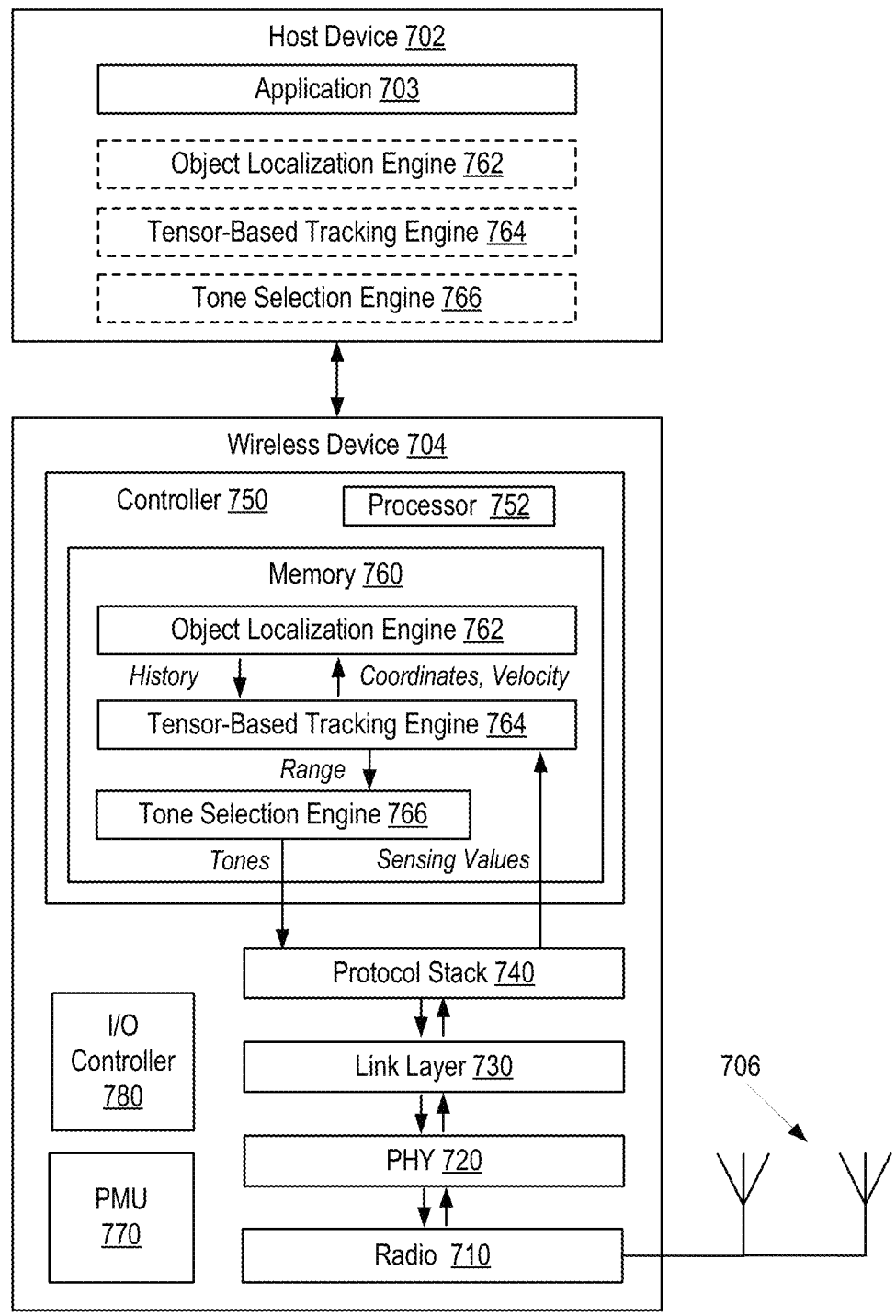
FIG. 7A illustrates one exemplary implementation of a wireless (BT and/or BLE) system capable of supporting efficient trajectory determination and tracking for fast and precise localization of objects, in accordance with some implementations.

FIG. 7A illustrates one exemplary implementation of a wireless (BT or BLE) system 700 capable of supporting efficient trajectory determination and tracking for fast and precise localization of objects, in accordance with some implementations. Wireless system 700 may be a BL network, a BLE network, a Wi-Fi, or any other type of a wireless network (e.g., PAN, WLAN, etc.). Wireless system 700 may include any number of host devices 702 (one host device is depicted for conciseness). A host device 702 may be any desktop computer, laptop computer, tablet, phone, smart TV, sensor, appliance, system controller (e.g., an air conditioning, heating, water heating controller), component of a security system, medical testing or monitoring equipment, automotive equipment, or any other type of a device. Host device 702 may be coupled (e.g., via a wired connection) to a respective wireless device 704. For brevity, shown is a single wireless device 704, but it should be understood that host device 702 may be coupled to any number of such wireless devices, e.g., a BLE wireless device and a Zigbee® wireless device. In some implementations, wireless device 704 may be implemented as an integrated circuit (IC) device (e.g., disposed on a single semiconductor die). In some implementations, various modules and components may be absent or shared between multiple wireless devices coupled to the host device (e.g., antenna(s) 706 and/or processor 752 may be shared between multiple wireless devices).

Wireless device 704 may use one or more antennas 706 to receive and transmit radio waves. A signal received by antenna(s) 706 may be processed by radio 710 which may include filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 706. Radio 710 may further include a tone (frequency) generator to generate radio signals at selected tones. Radio 710 may also include antenna control circuits to control access to one or more antennas 706, including switching between antennas. Radio 710 may additionally include radio control circuits, such as phase measurement circuits and a tone selector circuit. The phase measurement circuits can perform phase measurements on received signals, e.g., IQ decomposition, which may include measuring a phase difference between the received signal and a local oscillator signal. The tone selector circuit can select tones for transmission.

Radio 710 may provide the received (and digitized) signals to a PHY 720 components. PHY 720 may support one or more operation modes, e.g., BLE operation modes. Although one PHY 720 is shown, any suitable number of PHY layers (supporting a respective number of operation modes) may be present. PHY 720 may convert the digitized signals received from radio 710 into frames that can be fed into a Link Layer 730. Link Layer 730 may have a number of states, such as advertising, scanning, initiating, connection, standby. Link Layer 730 may transform frames into data packets. During transmission, data processing may occur in the opposite direction, with Link Layer 730 transforming data packets into frames that are then transformed by PHY 720 into digital signals provided to radio 710. Radio 710 may convert digital signals into radio signals and transmit the radio signals using antenna(s) 706. In some implementations, radio 710, PHY 720, and Link Layer 730 may be implemented as parts of a single integrated circuit.

Wireless device 704 may include a protocol stack 740. The protocol stack 740 may include a number of protocols, e.g., Logical Link Control Adaptation Protocol (L2CAP), which may perform segmentation and reassembly of data packets that are generated by one or more applications 703 operating on host device 702. Specifically, L2CAP may segment data packets of arbitrary size, as output by the application(s) 703, into packets of the size and format that can be processed by Link Layer 730. L2CAP may also perform error detection operations. The protocol stack 740 may also include generic access profile (GAP) and generic attribute profile (GATT). GAP may specify how wireless device 704 advertises itself on the wireless network, discovers other network devices, and establishes wireless links with the discovered devices. GATT may specify how a data exchange between communicating wireless devices is to occur once the connection between the two devices is established. The protocol stack 740 may further include a security manager (SM) that controls how pairing, signing, and encryption of data is performed. GATT may use attribute protocol (ATT) that specifies how units of data are transferred between devices. Wireless device 704 may also include other components not explicitly shown in FIG. 7A, such as a host-controller interface.

Wireless device 704 may have a controller 750, which may include one or more processors 752, such as central processing units (CPUs), finite state machines (FSMs), field-programmable gate arrays (FPGAs), application-specific integrated circuits (ASIC), or the like. Processor(s) 752 may also include custom logic and/or programmable logic, or any combinations thereof. In some embodiments, controller 750 may be a single processing device that supports processes associated with data transmission and reception as well as distance (and/or angle) estimation computations. In some implementations, wireless device 704 may have a dedicated processor for distance (and/or angle) estimation computations that is separate from a processor that executes other operations on wireless device 704 (e.g., processes associated with data transmission and reception).

Wireless device 704 may also include a power management unit (PMU) 770, which manages clock/reset and power resources. Wireless device 704 may further include an input/output (I/O) controller 780 to enable communications with other external devices (including non-network devices) and structures. In some implementations, I/O controller 780 may enable a general purpose I/O (GPIO) interface, a USB interface, a serial digital interface (SDI), a PCM digital audio module, a universal asynchronous receiver transmitter (UART), I²C, I²S, or any other I/O components.

Controller 750 may include a memory 760, which may be (or include) a non-volatile, e.g., read-only (ROM) memory, and/or volatile, e.g., random-access (RAM), memory. Memory 760 may store codes and supporting data for an object localization engine 762, a tensor-based tracking engine 764, a tone selection engine 766, and other suitable engines. In some implementations, any one or more of the engines may be located on host device 702, as indicated with the respective dashed boxes in FIG. 7A. The engines may be operating in conjunction with a domain-specific application 603, which may be a device- or asset-tracking application, an indoor navigation application, an authentication application, or any other suitable application. Placement of the engines 762-766 on host device 702 or wireless device 704 may be based on domain-specific criteria as well as on power constraints. In those implementations, where low latency is of high priority, engines 762-766 may be placed on wireless device 704. In other implementations, where reduced power consumption is advantageous, engines 762-766 may be placed on host device 702. In some implementations, some engines (e.g., tone selection engine 766) may be placed on wireless device 704 while other engines (e.g., object localization engine 762 and tensor-based tracking engine 764) may be placed on host device 702.

Application 703 may use information about various objects located in the environment of the host device 702/wireless device 704 (which may, in some implementations, be mounted on a single platform or in proximity of each other). Such information may include distances to the objects, directions to the objects, orientations of the objects relative to host device 702/wireless device 704, or any other spatial characteristics data. The data may be provided by the object localization engine 762, which receives and processes locations and velocities of various objects in the environment, as may be determined by the tensor-based tracking engine 764, e.g., as described above in relation to FIGS. 2-6. In some implementations, the tensor-based tracking engine 764 provides an expected range of distances to the objects to the tone selection engine 766. The expected range of distances may be dependent on specific application 703 that is supported by operations of wireless device 704. For example, in key fob applications, the range of distances may be up to several meters, in warehouse product tracking applications, the range of distances may be tens of meters or even more. Based on the received range of distances, the tone selection engine 766 may select tones for a given sensing event, which may be tones separated by a uniform frequency increment, e.g. $f_0+(k-1)\times\Delta f$. The tone selection engine 766 may further specify the total number N of tones to be used, e.g., k=1 ... N. In some implementations, the tone selection engine 766 may select tones that maximize the use of the available bandwidth (e.g., BT bandwidth), the tones that maximize the range of detected distances (e.g., closely spaced tones), the tones that maximize the accuracy of detected distances (e.g., widely spaced tones). In some implementations, the tone selection engine 766 may select tones randomly, or according to any predefined pattern.

Selected tones may be provided to protocol stack 740 (and link layer 730 and PHY 720) that may cause radio 710 to generate signals at the selected tones and transmit the generated signals to the outside environment. Radio 710 may then receive the reflected (returned) signals from various objects (other wireless devices) of the environment and determine phase shifts experienced by the reflected signals, e.g., by comparing the phase information carried by the reflected signals with phase information of the local oscillator copies of the transmitted signals. Radio 710 may further determine amplitudes of the reflected signals. The amplitude and phase information may be provided to the tensor-based tracking engine 764 (e.g., in the form of sensing values), which computes the covariance matrix. The tensor-based tracking engine 764 may include the location-velocity estimator 110 (depicted in FIG. 1), which performs optimized determination of the trajectories of various objects in the outside environment as described in relation to FIGS. 2-5 above. The tensor-based tracking engine 764 provides estimated trajectories of the objects to the object localization engine 762 that may perform tracking of the objects, authentication of the objects, maintaining communications with the objects and so on.

Figure 7B:
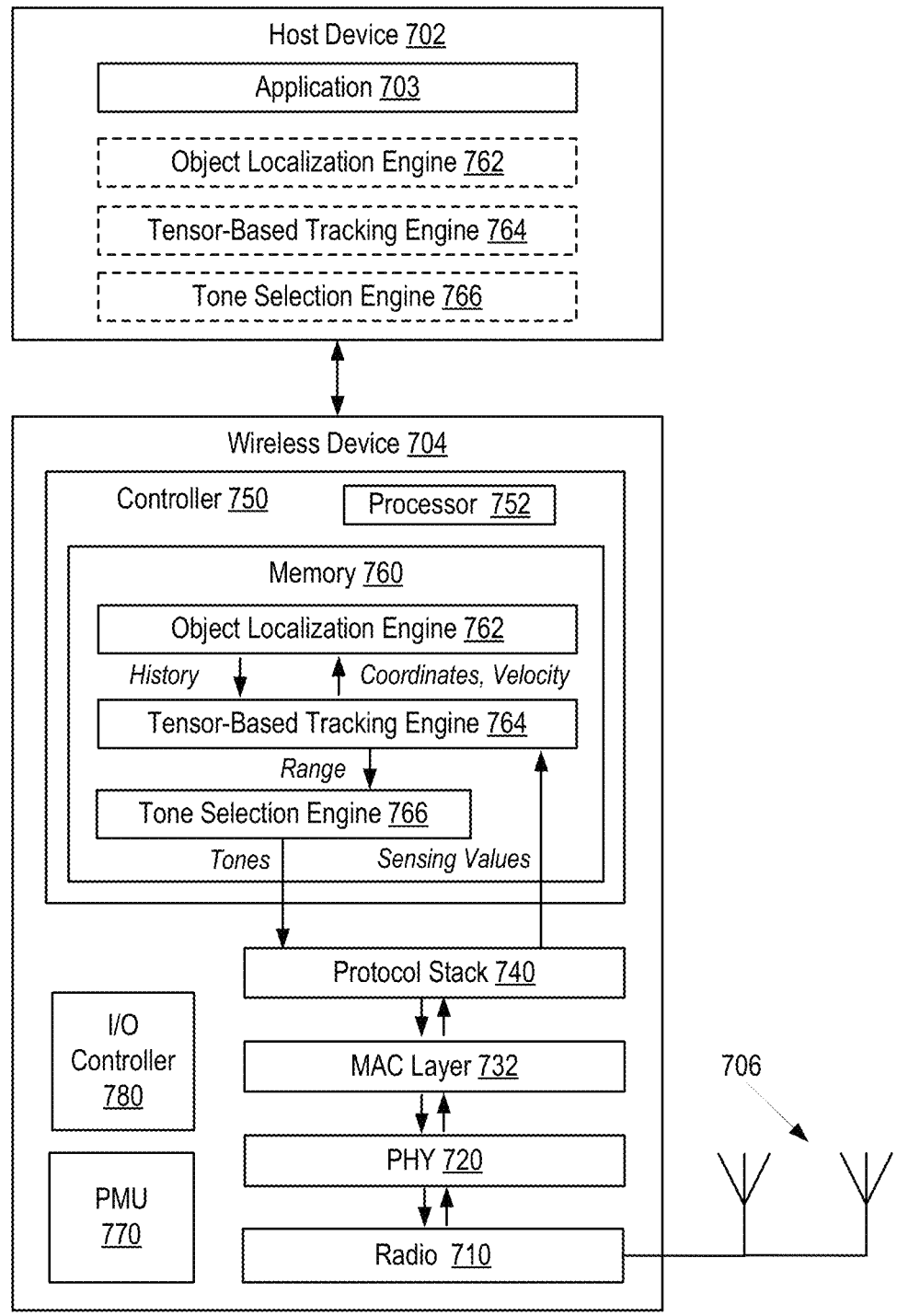
FIG. 7B illustrates one exemplary implementation of a wireless (WLAN) system capable of supporting efficient trajectory determination and tracking for fast and precise localization of objects, in accordance with some implementations

FIG. 7B illustrates one exemplary implementation of a wireless (WLAN) system 701 capable of supporting efficient trajectory determination and tracking for fast and precise localization of objects, in accordance with some implementations. Although the wireless system 700 has been described above in conjunction with BT/BLE implementations, similar systems may be used in conjunction with any WLAN (e.g., Wi-Fi) implementations. In a WLAN wireless system 701, an appropriate wireless media access control (MAC) layer 732 may be used instead of the Link Layer 730 in addition to a WLAN-specific PHY layer 720 and a protocol stack 740. In Wi-Fi, and other WLAN systems, sensing tones may be transmitted in a single packet.

Figure 8:
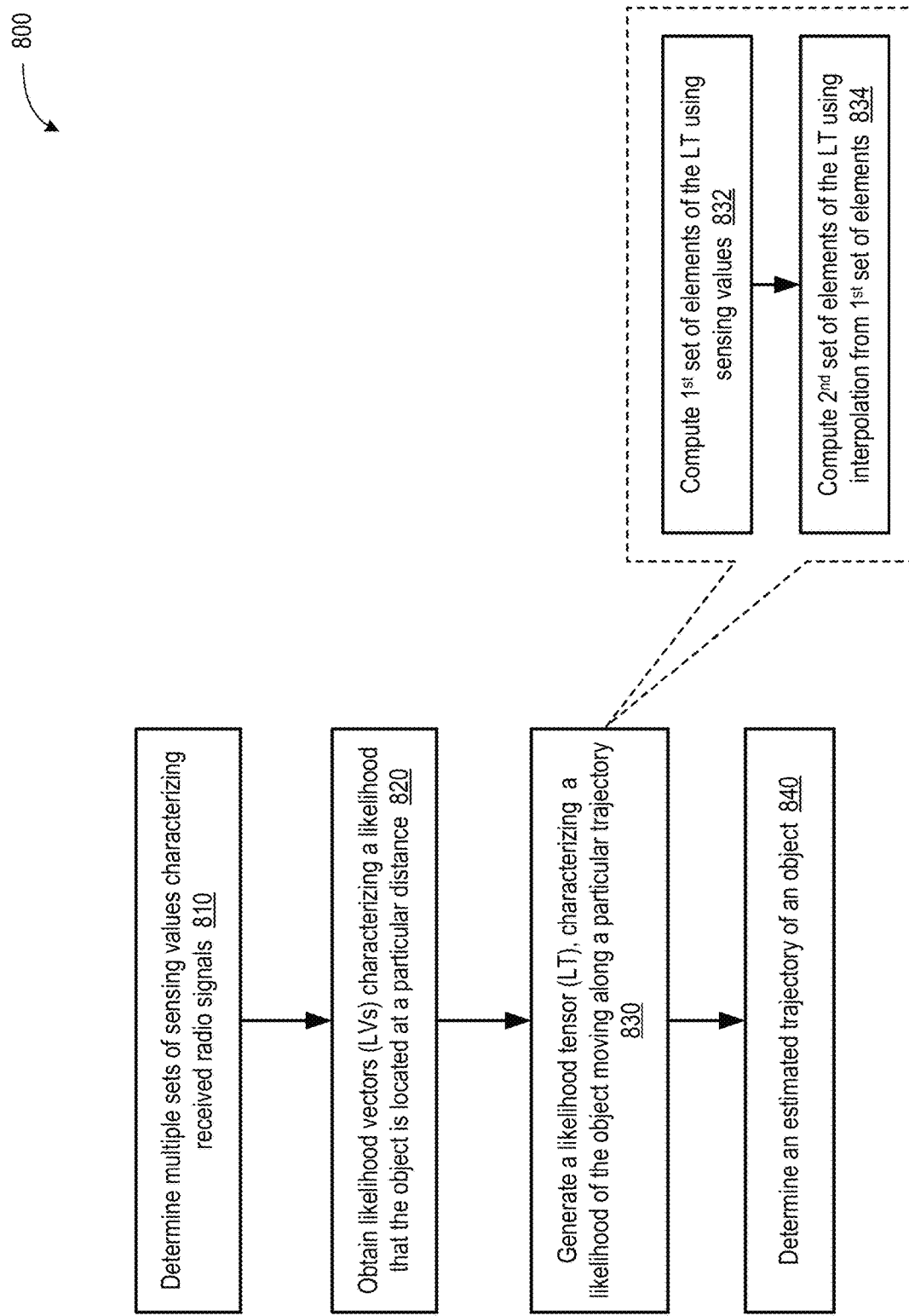
FIG. 8 is a flow diagram of an example method of efficient distance-based determination of a trajectory of an object in an environment of a wireless device, in accordance with some implementations.
Figure 9:
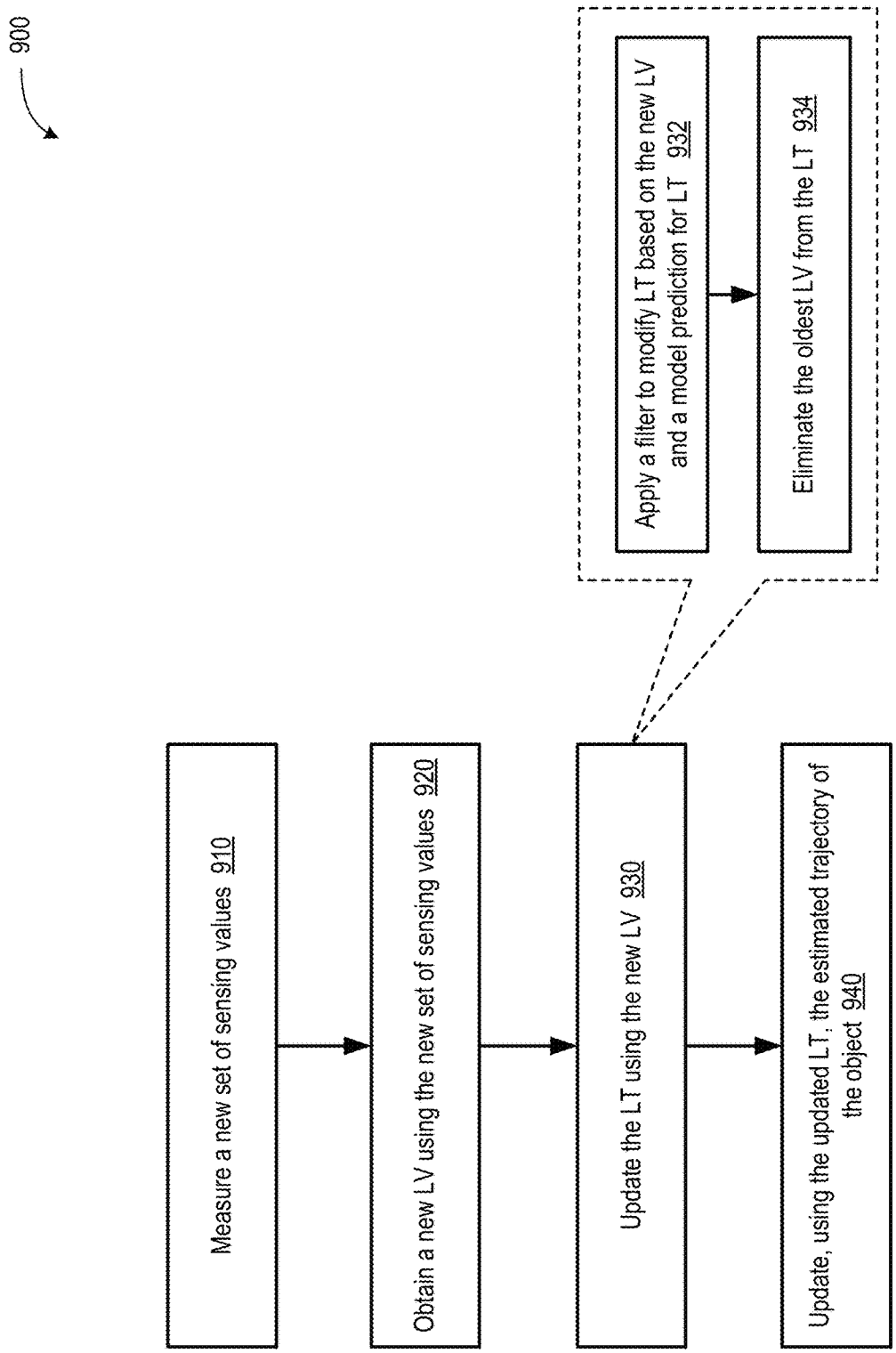
FIG. 9 is a flow diagram of an example method of efficient distance-based tracking of a trajectory of an object in an environment of a wireless device, in accordance with some implementations.

FIG. 8 and FIG. 9 are flow diagrams of example methods 800 and 900 of efficient determination and tracking of trajectories of objects in an environment of a wireless device, in accordance with some implementations. Methods 800 and 900 may be performed to identify distance from one or more objects in the outside environment. Methods 800 and 900 may be performed by a BT wireless device, a BLE wireless device, a WLAN wireless device, or any other suitable wireless device or apparatus. The wireless device may also include a radio configured to transmit, using one or more antennas, a plurality of sensing radio waves, e.g., Bluetooth sensing waves, Bluetooth Low Energy sensing waves, or Wi-Fi sensing waves. Methods 800 and 900 may be performed by a wireless controller of the wireless device, e.g., controller 750 of FIG. 7A. The controller may include a memory (e.g., memory 760) and a processing device (e.g., processor 752) communicatively coupled to the memory. The processing device may include hardware (e.g., circuitry, dedicated logic, programmable logic, microcode, etc.), firmware, and/or software, or any combination thereof. The controller 750 may receive data from radio 710, PHY 720, and other components/modules. In some implementations, the processing device performing methods 800 and 900 may execute instructions of tone selection engine 666. In certain implementations, each of methods 800 and 900 may be performed by a single processing thread. Alternatively, each of methods 800 and 900 may be performed by two or more processing threads, each thread executing one or more individual functions, routines, subroutines, or operations of the corresponding method. The processing threads implementing methods 800 and/or 900 may be synchronized (e.g., using semaphores, critical sections, and/or other thread synchronization mechanisms). Alternatively, the processing threads implementing methods 800 and 900 may be executed asynchronously with respect to each other. Various operations of methods 800 and 900 may be performed in a different order compared with the order shown in FIG. 8 and FIG. 9. Some operations of methods 800 and 900 may be performed concurrently with other operations. Some operations may be optional.

FIG. 8 is a flow diagram of an example method 800 of efficient distance-based determination of a trajectory of an object in an environment of a wireless device, in accordance with some implementations. At block 810, method 800 may include determining a plurality of sets of sensing values. Each set of sensing values, $\{r_j\}$, may characterize one or more radio signals received, during a respective one of a plurality of sensing events, from an object located in an environment of the wireless device (e.g., as illustrated in FIG. 1). The one or more radio signals received (as part of a given sensing event) may have different frequencies, e.g., frequencies spaced with increment $\Delta f$, which may be anywhere between 1 MHz and 50 MHz, or more. More specifically, each sensing value $r_j$ (j=1 . . . N) may characterize a signal of a particular frequency $f_j$ transmitted and then detected by the wireless device. Each sensing value $r_j$ may represent a combination (e.g., $\Sigma_{k=1}^{n} a_j(d_k) S_k$) of signals (with amplitudes $S_k$) received from the object over one or more paths (k=1 . . . n) in the environment. In some implementations, each of the radio waves received from the object may be generated responsive to reception, by the object, of a corresponding sensing radio wave transmitted by the wireless device.

At block 820, the processing device may obtain a plurality of likelihood vectors (LVs), e.g., $P_i(d)$. Each of the plurality of LVs may be obtained using a respective set of the plurality of sets of sensing values. For example, a first (second, third, etc.) LV may be generated using sensing values obtained as part of a first (second, third, etc.) sensing event that takes place at time $t_1$ ($t_2$, $t_3$, etc.). Each of the plurality of LVs may characterize a likelihood that the object is located at one of a set of distances (e.g., discrete distances) from the wireless device, e.g., with $P_i(d_1) > P_i(d_2)$ indicating that at the time of the sensing event $t_i$, the object is more likely located at distance $d_1$ than at distance $d_2$.

In some implementations, each of the plurality of LVs may be obtained using a steering vector having a plurality of elements $a_j(d_k)$. Each of the plurality of elements may characterize propagation of a respective radio signal (e.g., signal of frequency $f_j$) of the one or more radio signals over a path between the wireless device and the object (e.g., a path of length $2d_k$). In implementations that deploy MUSIC algorithms, each of the plurality of LVs may be obtained using one or more noise eigenvectors or signal eigenvectors of a covariance matrix of a respective set of the plurality of sets of sensing values.

In some implementations, obtaining each of the plurality of LVs may include interpolation. More specifically, elements of any given LV, e.g., $P_i(d)$ for sensing event $t_i$, may be computed based on measured sensing values for a limited number of distances d, followed by interpolation to additional distances. For example, a given LV may have 100 elements, of which 20 elements (e.g., corresponding to 20 different distances d) may be computed based on the measured sensing values while the remaining 80 elements may be interpolated using the 20 elements.

At block 830, method 800 may continue with the processing device generating, using two or more LVs of the plurality of LVs, a likelihood tensor (LT), e.g., $P(d_0, v)$, $P(\vec{r}_0, \vec{v})$, and the like. The LT may be defined on a location-velocity space (e.g., d-v space or $\vec{r}_0$-$\vec{v}$ space) that includes one or more distance dimensions and one or more velocity dimensions. The one or more distance dimensions of the location-velocity space may include one (e.g., $d_0$) or two (e.g., any suitable components of $\vec{r}_0$) spatial coordinates of the object at a reference time (e.g., some time that taken as time t=0). The distance dimension(s) and the velocity dimension(s) (e.g., v or any suitable components of $\vec{v}$) may be defined in relation to any coordinates, such as, Cartesian coordinates (e.g., $x_0$, $y_0$; $v_x$, $v_y$), polar coordinates (e.g., $r_0$, $\phi_0$; v, $\theta$), elliptical coordinates, spherical coordinates, cylindrical coordinates, and the like). The LT may characterize a likelihood that the object is moving along one of a set of trajectories identified by a point in the location-velocity space.

In some implementations, as indicated with the callout portion of FIG. 8, generating the LT may include, at block 832, computing a first set of elements of the LT using the plurality of sets of sensing values, and may further include, at block 834, computing a second set of elements of the LT using interpolation from the first set of elements of the LT. It should be understood that "first" and "second" do not presuppose any temporal or processing order. Accordingly, the first set of elements of the LT and the second set of elements of the LT may include any elements of the LT. In some implementations, the first set of elements of the LT may include at least some elements of each LV of the plurality of LVs. For example, the first set of elements of the LT may include all or some elements of each LV, e.g., at least some elements corresponding to the bottom row of cells of the LT depicted in FIG. 4A and FIG. 4B. The interpolation may then determine the elements corresponding to the remaining rows of the cells in FIG. 4A and FIG. 4B. In one illustrative example, the LT may have 50 rows and 100 columns. Initially, 20 elements of each LV may be computed based on the measured sensing values while the remaining 80 elements of each LV may be interpolated using the respective 20 elements. Adding (element by element) the LVs computed in this way determines the bottom row of the LT. The remaining 49 rows of the LT may then be computed using interpolation from the elements of the LVs of the bottom row.

In some implementations, the LT is generated using one or more LVs obtained based on sensing values measured by a different wireless device, e.g., as described above in conjunction with FIG. 5C and FIG. 6B.

At block 840, method 800 may include determining, using the LT, an estimated trajectory of the object. For example, determining the estimated trajectory of the object may include identifying one or more extrema of the LT, and may further include selecting an extremum of the LT that is associated with the shortest distance to the object (e.g., the line-of-sight path, which is unobstructed by other objects). The estimated trajectory of the object may include a velocity of the object v (or multiple components of the vector velocity $v_x$, $v_y$, $v_z$) and a distance to the object $d_0$ (or reference vector location with coordinates $x_0$, $y_0$, $z_0$) at a reference time (e.g., zero or any other reference time to). In some implementations, the estimated trajectory of the object may be provided to an application being executed on a host device that is in communication with the wireless device that estimates the trajectory of the object.

FIG. 9 is a flow diagram of example method 900 of efficient distance-based tracking of a trajectory of an object in an environment of a wireless device, in accordance with some implementations. Method 900 may be performed as part of method 800 or as an extension of method 800. For example, method 800 may perform initial trajectory determination for a particular object whereas method 900 may perform the subsequent trajectory tracking. At block 910, method 900 may include determining a new set of sensing values, e.g., as part of an additional sensing event. At block 920, method 900 may continue with obtaining a new LV using the new set of sensing values. At block 930, method 900 may include updating the LT using the new LV. As depicted with the callout portion in FIG. 9, updating the LT may include, at block 932, applying a filter to an element of the LT, which may be any element of the LT. Applying the filter may include modifying the element of the LT based on the new LV, and further based on any suitable model that predicts a temporal change of the corresponding element of the LT. In some embodiments, as indicated with block 934, updating the LT may include eliminating the contribution of the oldest LV from the LT. At block 940, the processing device performing method 900 may update, using the updated combined LT, the estimated trajectory of the object.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other examplar language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   determining, by a wireless device, a plurality of sets of sensing values, each set of sensing values characterizing one or more radio signals emitted by the wireless device during a respective one of a plurality sensing events and reflected from an object located in an environment of the wireless device;
   obtaining a plurality of likelihood vectors (LVs), wherein each LV of the plurality of LVs is obtained using a respective set of the plurality of sets of sensing values and characterizes a probability distribution that the object is located, during a corresponding sensing event, at a set of distances from the wireless device;
   generating, using two or more LVs of the plurality of LVs, a likelihood tensor (LT), wherein the LT is defined on a location-velocity space that comprises one or more distance dimensions and one or more velocity dimensions, and wherein the LT characterizes a likelihood that the object is moving along one of a set of trajectories; and
   determining, using the LT, an estimated trajectory of the object.

2. The method of claim 1, wherein each of the plurality of LVs is obtained using a steering vector having a plurality of elements, wherein each of the plurality of elements characterizes propagation of a respective radio signal of the one or more radio signals over a path between the wireless device and the object.

3. The method of claim 2, wherein each of the plurality of LVs is obtained using one or more noise eigenvectors or signal eigenvectors of a covariance matrix of a respective set of the plurality of sets of sensing values.

4. The method of claim 1, wherein the one or more distance dimensions of the location-velocity space comprise two spatial coordinates of the object at a reference time, and wherein the one or more velocity dimensions of the location-velocity space comprise two velocity components of the object.

5. The method of claim 1, wherein generating the LT comprises:
computing a first set of elements of the LT using the plurality of sets of sensing values; and
computing a second set of elements of the LT using interpolation from the first set of elements of the LT.

6. The method of claim 5, wherein the first set of elements of the LT comprises at least some elements of each LV of the plurality of LVs.

7. The method of claim 1, further comprising: determining a new set of sensing values;
obtaining a new LV using the new set of sensing values;
updating the LT using the new LV; and
updating, using the updated LT, the estimated trajectory of the object.

8. The method of claim 7, wherein updating the LT comprises eliminating an oldest LV from the LT.

9. The method of claim 7, wherein updating the LT comprises applying a filter to an element of the LT, wherein applying the filter comprises modifying the element of the LT based on:
the new LV, and
a model that predicts a temporal change of the element of the LT.

10. The method of claim 9, wherein determining the estimated trajectory of the object further comprises selecting an extremum of the LT that is associated with a shortest distance to the object.

11. The method of claim 1, wherein determining the estimated trajectory of the object comprises identifying one or more extrema of the LT.

12. The method of claim 1, wherein the LT is generated using one or more LVs obtained based on sensing values measured by a different wireless device.

13. An apparatus comprising:
a radio;
a memory; and
a processing device coupled to the memory, the processing device configured to:
measure a plurality of sets of sensing values, each set of sensing values characterizing one or more radio signals emitted by the radio during a respective one of a plurality sensing events and reflected from an object located in an environment of a wireless device;
obtain a plurality of likelihood vectors (LVs), wherein each LV of the plurality of LVs is obtained using a respective set of the plurality of sets of sensing values and characterizes a probability distribution that the object is located, during a corresponding sensing event, at a set of distances from the wireless device;
generate, using two or more LVs of the plurality of LVs, a likelihood tensor (LT), wherein the LT is defined on a location-velocity space that comprises one or more distance dimensions and one or more velocity dimensions, and wherein the LT characterizes a likelihood that the object is moving along one of a set of trajectories; and
determine, using the LT, an estimated trajectory of the object.

14. The apparatus of claim 13, wherein to obtain each of the plurality of LVs, the processing device is to:
compute a first set of elements of the LT using the plurality of sets of sensing values, wherein the first set of elements of the LT comprises at least some elements of each LV of the plurality of LVs; and
compute a second set of elements of the LT using interpolation from the first set of elements of the LT.

15. The apparatus of claim 13, wherein the processing device is to:
measure a new set of sensing values;
obtain a new LV using the new set of sensing values;
update the LT using the new LV; and
update, using the updated LT, the estimated trajectory of the object.

16. The apparatus of claim 15, wherein to update the LT the processing device is to:
eliminate an oldest LV from the LT; and
apply a filter to an element of the LT to modify the element of the LT based on the new LV, and a model that predicts a temporal change of the element of the LT.

17. The apparatus of claim 13, wherein the processing device is to generate the LT using one or more LVs obtained based on sensing values measured by a different wireless device.

18. A system comprising:
a host device configured to execute an application; and
a wireless device, communicatively coupled to the host device, the wireless device comprising:
a radio comprising one or more antennas; and
a wireless controller configured to:
measure a plurality of sets of sensing values, each set of sensing values characterizing one or more radio signals emitted by the wireless device during a respective one of a plurality sensing events and reflected from an object located in an environment of the wireless device;
obtain a plurality of likelihood vectors (LVs), wherein each LV of the plurality of LVs is obtained using a respective set of the plurality of sets of sensing values and characterizes a probability distribution that the object is located, during a corresponding sensing event, at a set of distances from the wireless device;
generate, using two or more LVs of the plurality of LVs, a likelihood tensor (LT), wherein the LT is defined on a location-velocity space that comprises one or more distance dimensions and one or more velocity dimensions, and wherein the LT characterizes a likelihood that the object is moving along one of a set of trajectories;
determine, using the LT, an estimated trajectory of the object; and
provide the estimated trajectory of the object to the application.

19. The system of claim 18, wherein to obtain each of the plurality of LVs, the wireless controller is to:
compute a first set of elements of the LT using the plurality of sets of sensing values, wherein the first set of elements of the LT comprises at least some elements of each LV of the plurality of LVs; and
compute a second set of elements of the LT using interpolation from the first set of elements of the LT.

20. The system of claim 18, wherein the wireless controller is further to:
  measure a new set of sensing values;
  obtain a new LV using the new set of sensing values;
  update the LT using the new LV; and
  update, using the updated LT, the estimated trajectory of the object.

21. The system of claim 20, wherein to update the LT, the wireless controller is to:
  eliminate an oldest LV from the LT; and
  apply a filter to an element of the LT to modify the element of the LT based on the new LV, and a model that predicts a temporal change of the element of the LT.

* * * * *